(12) United States Patent
Brock

(10) Patent No.: US 7,181,696 B2
(45) Date of Patent: Feb. 20, 2007

(54) SYSTEM AND METHOD FOR PERFORMING MARKET RESEARCH STUDIES ON ONLINE CONTENT

(75) Inventor: Stephen P. Brock, Cincinnati, OH (US)

(73) Assignee: Blue Bear LLC, Cincinnati, OH (US)

( * ) Notice: Subject to any disclaimer, the term of this patent is extended or adjusted under 35 U.S.C. 154(b) by 622 days.

(21) Appl. No.: 09/945,933

(22) Filed: Sep. 4, 2001

(65) Prior Publication Data

US 2002/0072955 A1    Jun. 13, 2002

Related U.S. Application Data

(60) Provisional application No. 60/229,862, filed on Sep. 1, 2000.

(51) Int. Cl.
*G06F 3/00* (2006.01)

(52) U.S. Cl. ............ 715/758; 715/751; 715/750; 715/704; 715/752; 715/744; 715/755; 715/756

(58) Field of Classification Search ............ 345/751, 345/750, 709, 752, 753, 749, 755, 754, 756, 345/758, 759, 733; 725/9, 13
See application file for complete search history.

(56) References Cited

U.S. PATENT DOCUMENTS 5,404,509 A    4/1995   Klein (Continued)

FOREIGN PATENT DOCUMENTS

WO    WO 00/26836    5/2000

(Continued)

*Primary Examiner*—Kristine Kincaid
*Assistant Examiner*—Peng Ke
(74) *Attorney, Agent, or Firm*—Wood, Herron & Evans, L.L.P.

(57) ABSTRACT

A system and method for conducting market research studies on online content utilizing moderator and respondent computers connected over a network. A moderator at the moderator computer directs a plurality of respondents at the respondent computers to view preselected subject matter displayed on the respondent computers and collects comments and reactions on the subject matter from the respondents in a database for later review and for benchmarking. Software resident in the respondent computers enables the respondents to view a plurality of screens showing different aspects of the online content and, in a preferred embodiment, provides buttons that can be activated by the respondents to indicate a reaction to the content. In addition, the preferred embodiment enables the respondents to provide text comments to the content. Software resident in the moderator computer enables a moderator to view the progress of the respondents through the online content and view the reactions and comments of the respondents to each screen display, all in real time, as well as view the time spent by each respondent viewing each different screen. The moderator software also enables the moderator to force comments and reactions from the respondents, as well as gather personal data from the respondents, and to print out reports displaying the results. The system of the invention also includes client computers so the clients for whom the study is conducted may view the comments and reactions in real time and exchange messages with the moderator.

66 Claims, 25 Drawing Sheets

U.S. PATENT DOCUMENTS

| | | |
|---|---|---|
| 5,740,035 A | 4/1998 | Cohen et al. |
| 5,878,186 A * | 3/1999 | Bennett et al. ............... 386/85 |
| 5,894,595 A * | 4/1999 | Foladare et al. ......... 455/556.2 |
| 5,963,916 A | 10/1999 | Kaplan |
| 5,991,373 A * | 11/1999 | Pattison et al. .......... 379/93.17 |
| 6,038,554 A | 3/2000 | Vig |
| 6,105,055 A | 8/2000 | Pizano et al. |
| 6,256,663 B1 * | 7/2001 | Davis ........................ 709/204 |
| 6,317,722 B1 * | 11/2001 | Jacobi et al. ................. 705/14 |
| 6,343,990 B1 * | 2/2002 | Rasmussen et al. .......... 463/25 |
| 6,356,922 B1 * | 3/2002 | Schilit et al. ............... 715/512 |
| 6,362,837 B1 * | 3/2002 | Ginn ......................... 345/751 |
| 6,385,590 B1 | 5/2002 | Levine |
| 6,530,019 B1 * | 3/2003 | Carroll .......................... 713/2 |
| 6,678,698 B2 * | 1/2004 | Fredell et al. ........... 707/104.1 |
| 6,741,967 B1 | 5/2004 | Wu et al. |
| 2002/0013834 A1 * | 1/2002 | Esakov et al. .............. 709/223 |
| 2002/0016788 A1 * | 2/2002 | Burridge ..................... 707/10 |
| 2002/0087388 A1 | 7/2002 | Keil et al. |
| 2002/0147776 A1 | 10/2002 | Lippiner et al. |
| 2002/0152110 A1 | 10/2002 | Stewart et al. |
| 2002/0194054 A1 | 12/2002 | Frengut |
| 2005/0159921 A1 * | 7/2005 | Louviere et al. ............ 702/181 |

FOREIGN PATENT DOCUMENTS

WO    WO 00/75829    12/2000

* cited by examiner

Jim's Project . Group #1 . Ken

| | | 196 | 198 | 200 | 202 | 204 |
|---|---|---|---|---|---|---|
| | | Seq | URL | Vote | Comment | TimeSpent |
| 182 | — | 328 | http://www.msn.com/ | | | 01:40 |
| 184 | — | 329 | http://www.dilbert.com/ | | | 00:25 |
| 186 | — | 330 | http://www.msn.com/ | | | 00:16 |
| 188 | — | 331 | http://www.dilbert.com/ | | | : |
| 190 | — | 327 | http://www.barnesandnoble.com/bookshelf/children/harry_potter/harry.asp?sourceid=000023465809371948088&bfdate=07-07-2000+15:10: | 1 | Good book description | 03:04 |
| 192 | — | 326 | http://www.msn.com/ | 3 | This is confusing | 03:43 |
| 194 | — | 326 | http://www.msn.com/ | 2 | Too Busy | 03:43 |

| 4. What did you think about specific elements of the website? (choose appropriate selection) | | | | | |
|---|---|---|---|---|---|
| Positive (Made me want to stay longer) | 1 | 2 | 3 | 4 | 5 | Negative (Made me want to leave sooner) |
| The overall look of the site was appealing | ⊙ | ○ | ○ | ○ | ○ | The overall look of the site was unappealing |
| The overall layout seemed logical and intuitive. | ⊙ | ○ | ○ | ○ | ○ | The overall layout seemed illogical and not intuitive. |
| The overall purpose or main idea of the site was clear to me. | ○ | ⊙ | ○ | ○ | ○ | The overall purpose or main idea of the site was unclear to me. |
| The site had a personality | ○ | ⊙ | ○ | ○ | ○ | The site had no personality |
| The site gave off a "mood" or "character" that was clear and attractive, and made me want to stay. | ⊙ | ○ | ○ | ○ | ○ | The site gave off a "mood" or "character" that was unclear or unattractive, and made me want to leave |
| The use of color, graphics and photos enhanced the site | ○ | ○ | ⊙ | ○ | ○ | The use of color, graphics and photos detracted from the site |
| The pages were easy to read and understand. | ○ | ○ | ⊙ | ○ | ○ | The pages were hard to read and understand. |
| It was easy to find what I was looking for. | ○ | ○ | ○ | ⊙ | ○ | It was hard to find what I was looking for. |
| What I was on the site made me curious to learn/see more. | ○ | ⊙ | ○ | ○ | ○ | What I saw on the site bored me. |
| I think the site gave me helpful or interesting information. | ○ | ⊙ | ○ | ○ | ○ | I think the site failed to give me helpful or interesting information. |
| I think the site offered appealing products or services that I might want to buy or use | ○ | ○ | ○ | ⊙ | ○ | I think the site offered unappealing products or services that I doubt I would want to buy or use. |
| I think the site was credible – I feel I could trust the information and my transaction and personal information would be secure | ○ | ⊙ | ○ | ○ | ○ | I think the site wasn't credible – I feel I couldn't trust the information and my transaction an personal information would not be secure |

SYSTEM AND METHOD FOR PERFORMING MARKET RESEARCH STUDIES ON ONLINE CONTENT

CROSS-REFERENCE TO RELATED APPLICATION

This application claims priority under 35 U.S.C. §120 from U.S. Application Ser. No. 60/229,862 filed Sep. 1, 2000.

BACKGROUND

The present invention is directed to a system and method for performing market research studies on online content accessible by remote computers over a network and more particularly, to a system and method for performing focus group studies on online content accessible by computers over a network.

The Internet is an emerging and rapidly-growing marketplace with immense distributive power. Unlike many traditional marketplaces, the Internet marketer and consumer are physically separated. The Internet marketer promotes his goods by way of a Web site which comprises a home page and may further comprise multiple additional pages that together display information about the marketer and the products being marketed. Most such Web sites also enable a customer to place orders for the products being marketed. Other Web sites are strictly informational in nature and may comprise pages of articles, pictures and charts, or provide a search engine that enables a visitor to search for a particular Web site or to develop a list of Web sites on a particular topic. The latter two types of Web sites may derive revenue from advertising placed on the pages and viewed by visitors to the site or by payments from the proprietors of the sites to whom the visitor is directed.

Many marketers lack the technical capability to develop a Web site and must rely on third party site development companies. Larger marketing organizations may possess sufficient resources to develop their own in-house site developers. In either case, since a Web site provides a direct link between a vendor and a potentially huge customer base without the presence of a human sales assistant as an intermediary, the Web site must be "user friendly." It must be designed so that the purpose of the site is clear and unambiguous and so that navigating the site is intuitive. Unfortunately, there is at present no reliable way to determine the effectiveness and "user friendliness" of a Web site empirically. This is because it is possible for literally millions of potential purchasers to visit a Web site and not leave a trace of having been there. In addition, it is not possible to determine how many visitors to a Web site did not make a purchase or complete a transaction because the purpose of the Web site was not readily ascertainable or the steps needed to conduct a transaction were hard to follow.

As a result, marketing strategists and researchers are seeking ways to collect qualitative data from visitors to their clients' Web sites. For example, researchers have assembled focus groups of consumers and had them use computers to access a client's Web site via the Internet. Typically, such a focus group is assembled in a room and each member of the group is assigned to a computer. The group is directed by a moderator to go to predetermined pages and perform certain predetermined operations. However, a disadvantage of that system is that it is not possible to collect data pertaining to the pages visited by the members of the group or to obtain each subject's initial emotional reaction to the specific Web pages visited. Therefore, that system and method were incapable of generating meaningful data showing the effectiveness of a Web site in promoting sales and whether a site is user friendly.

Accordingly, there is a need for a system and method that will allow marketing strategists and researchers to conduct focus group studies for their clients' Web sites that probe the group's attitudes and reactions while the group navigates specified Web sites and analyze the group's navigation through the Web site and obtain qualitative ratings and comments provided by the group while the group navigates the subject Web site during the study. There is also a need for a system and method that is sufficiently flexible to be used for obtaining a subject's reaction to any online content, such as product design or packaging.

SUMMARY

The present invention is a system and method for performing market research studies of online content that produces in-depth, qualitative data regarding the usability, appearance and effectiveness of the subject matter of the study. The invention groups a plurality of respondents (e.g., a focus group) in a room with at least one moderator. The moderator and respondents each have computers operatively networked to each other. In a preferred embodiment, the subject of the study is an Internet Web site. In that embodiment, each respondent computer includes a specialized browser that not only allows each respondent to visit various Web pages on the Internet, but also reports to the moderator computer the address of each Web page visited by each respondent and the time spent at each page, along with qualitative data entered by the respondent using the specialized browser. The moderator collects the Web page address data reported by each of the respondent computers along with the qualitative data reported by each of the respondent computers and stores the address data and qualitative data in a database on the moderator computer, or alternatively, in a remote storage device.

The moderator at the moderator computer leads group discussions as the focus group operates on-line with the subject Web sites. For example, the moderator may request each of the respondents to perform a particular task on a Web site (e.g., enroll), and then can record and analyze the path that each respondent takes in performing the task, along with any qualitative data (in the form of real time comments) provided by each of the respondents during the course of performing this task. Subsequent to the study, all of the data captured by the moderator computer in the database can be processed for preparing reports to the client commissioning the study regarding the usability and effectiveness of the client's Web site and to compile a database comprising many such client studies. In one embodiment of the invention, client representatives themselves have computers similar to the moderator's computer, but are wirelessly coupled to the respondent computers. Such client computers monitor the focus group from a remote location, for example, in a separate room.

Preferably, the specialized browser on each of the respondent computers includes a plurality of qualitative ratings buttons or icons activatable by the respondent to rate the current page presently being viewed. The ratings buttons include a favorable-rating button ("like"), an unfavorable rating button ("dislike"), a frustration-rating button and a confusion-rating button. Alternatively, the rating buttons can be numeric (e.g., 1–5), alphabetical (e.g., A–F) or the like. Additionally, the specialized browsers can be set up to request comments from the respondents when the respondent activates one of the ratings buttons. Therefore, when, for example, a respondent activates the "dislike" rating button, the specialized browser will provide a window or form on which the respondent can enter comments setting forth the reasons why he or she activated the "dislike" button. Once entered, the respondent computer will report the rating and associated comments to the moderator computer for storage in the database and for subsequent analyses.

As will be obvious to those of ordinary skill in the art, the present invention is not limited to use on the Internet. For example, the present invention may be used with pervasive technologies such as kiosks, PDAs, on-board aircraft, intranets and other networks and mainframe computer systems.

Accordingly, it is an object of the present invention to provide a system for performing market research studies on a subject, such as, for example a software application, accessible by remote computers over a network that comprises: a plurality of respondent computers operatively coupled to the network, where each of the respondent computers has a respondent software device programmed to download and run the software application (e.g., the Web pages to be studied) from the network and including a respondent graphical user interface program (for viewing the Web pages) to operate simultaneously with the software application on the respondent computer, where the respondent graphical user interface includes ratings buttons (e.g., favorable or unfavorable); and a moderator computer operatively coupled to each of the respondent computers having a moderator software device and a database, where the moderator software device is programmed to communicate with each of the respondent software devices operating on the respondent computers, collect rating signals from the respondent computers corresponding to the activation of rating buttons on the respondent graphical user interfaces and store data associated with the rating signals collected in the database.

Preferably, the respondent graphical user interface is further programmed to query a user of the respondent computer (when commanded by the moderator software) for a comment responsive to a user activating a particular rating button and the moderator software device is further programmed to receive the comment over the network from the respondent graphical user interface and store the comment in the database along with the data associated with the ratings signal. It is also preferred that the respondent software device be further programmed to generate a snapshot of the software application's image-based output substantially as it appears on a display device of the respondent's computer and the moderator device is further programmed to collect the snapshot from the respondent's software device and store the snapshot in the database along with the data associated with the ratings signal and comments collected in the database. In one embodiment, the respondent graphical user interface is further programmed to allow a user to over-write marks and notations on the snapshot to provide further qualitative data for analysis.

It is also preferred that the moderator software device includes programming for displaying data in real time on a display device of the moderator computer respondent. For example, it is preferred that the moderator software device be programmed to display rating signals along with comments provided by each of the respondents in a number of different formats. One format, for example, is a per-user format, where the moderator will be able to view the data collected from a single one of the respondents in the focus group in real time. Of course, the moderator computer could be set up to show a plurality of such respondent-based views in a multi-window format so the respondents' data can be shown on a single display device collectively. If the software application is a Web site accessed over the Internet, then the moderator computer could utilize a per-address display format, where the moderator would be able to view the respondents visiting a particular Web page and ratings and/or comments (if any) submitted by the respondents when visiting the particular Web page.

It is another object of the present invention to provide a system for performing focus group studies on at least one Web page accessible by remote computers over the Internet, comprising: a plurality of respondent computers operatively coupled to the Internet, where each of the respondent computers has a respondent browser device programmed to download and display the Web page and where the respondent browser has a graphical user interface that includes at least a favorable ratings button and an unfavorable ratings button; and at least one moderator computer operatively coupled to each of the respondent computers having a moderator software device and a database, where the moderator software device is programmed to communicate with each of the respondent browser devices operating on the respondent computers, collect rating signals from the respondent computers corresponding to the activation of rating buttons on the graphical user interfaces of the respondent browsers, and store data associated with the rating signals collected in the database.

Preferably, the graphical user interface of the respondent browser device is further programmed to query a user of the respondent computer for a comment responsive to a user activating a particular ratings button and the moderator software device is further programmed to collect the comment from the respondent browser device and store the comment in the database along with data associated with the rating signal collected from the respondent computer.

Also in the preferred embodiment, the moderator computer includes a moderator graphical user interface programmed to display data associated with the rating signals and comments collected in real time. Furthermore, the moderator software device includes a clock and is further programmed to record timing data corresponding to the rating signal data and comments stored in the database. The moderator software device is also preferably programmed to collect address data from the respondent browser device and store the address data in the database with the corresponding rating signal data comments and timing data.

It is also preferred that the moderator software device be further programmed to allow the moderator to specify the Web page address for each of the respondent computers. Therefore, when the moderator software device specifies such a Web page address, the respondent browser devices will immediately download the Web page specified by the moderator computer, thereby allowing the moderator to take the entire focus group to a single Web page.

It is also preferred that the respondent browser device be further programmed to generate a snapshot of the Web page substantially as it appears on a display device of the respondent computer and the moderator software device be further programmed to collect the snapshot from the respondent software device and store the snapshot in the database along with the data associated with the rating signals collected in the database. Additionally, the moderator graphical user interface is preferably further programmed to display a snapshot collected from the respondent software device along with real time rating signal data, comments, timing data and address data for at least one of the plurality of the respondent computers. In one embodiment, the respondent browser device is further programmed to allow a user to overwrite the marks and notations onto the snapshot, thereby providing additional qualitative data for processing and display.

Another object of the present invention is to provide a method for performing focus group studies on at least one Web page accessible by remote computers over the Internet. This method comprises the steps of: operatively coupling a plurality of respondent computers to the Internet, the respondent computers including a respondent browser device for downloading and displaying a Web page from the Internet and a graphical user interface that includes at least two ratings buttons programmed to generate rating signals when activated, where the ratings buttons include a favorable rating button and a unfavorable rating button; operatively coupling a moderator computer to the plurality of respondent computers, where the moderator computer includes a moderator software device; downloading and displaying a Web page from the Internet by the respondent browser device on a first one of a plurality of respondent computers; collecting a rating signal by the moderator software device from the first one of the respondent computers; and storing the rating signal collected by the moderator software device into a database record associated with the first one of the respondent computers. Preferably, the method further comprises the step of storing a Web address of the Web page into the database record associated with the first one of the respondent computers.

It is also preferred that the method further comprises the steps of: responsive to the activation of a rating button on a first one of the respondent computers, recording comment data by the first one of the respondent computers; collecting the comment data by the moderator software device from the first one of the respondent computers; and storing the comment data collected by the moderator software device into the database record associated with the first one of the respondent computers. The step of recording the comment data may include a step for providing an area on the graphical user interface of the respondent browser device of the first one of the respondent computers for recording comments typed in by a user of the first one of the respondent computers. Alternatively, the step of recording comment data may include a step of recording a voice of a user of the first one of the respondent computers, or may include a step of recording a video of a user of the first one of the respondent computers, or may include a step of providing a snapshot of the Web page and recording notations made by a user of the first one of the respondent computers on the snapshot using a marking device associated with the graphical user interface of the respondent browser device.

In a preferred embodiment of the invention, the moderator software is programmed to provide the moderator with a "glimpse view screen." The glimpse view screen preferably provides multiple boxes or windows that, taken together, provide a real time snapshot of the activity of the focus group at any particular time during a focus study session. In addition, the glimpse view screen can be modified by the moderator to display historical data with respect to the Web pages (or other subject matter) viewed by the focus group, the time spent by the focus group on individual Web pages, the time each individual member of the focus group spends on a particular Web page, the comments generated by the focus group, grouped either by participant or Web page, and can provide a listing of the comments with an automatic tally with the types of comments received.

In addition, the glimpse view screen enables the moderator to exchange instant messages with a client or clients at a remote location, select tasks for the focus group to perform at a particular Web page (e.g., enroll as a member) or create new tasks. In addition, the glimpse view screen enables the moderator to, in real time, enable or disable voting by the respondents, direct the respondents to a particular Web page to survey, enable or disable instant messaging with the client or clients and to force the respondents to provide a comment before moving from one Web page to another. Consequently, the glimpse view screen provides wide latitude and flexibility to a moderator to direct the activity of a focus group and to gather meaningful information from the focus group in real time.

Also with this preferred embodiment, a moderator is provided with an administration screen that enables a moderator to create a particular focus study. This administration screen enables a moderator to select from among existing projects or to create a new project, to select from among existing focus groups or to modify or create new focus groups, and to select from among various Web pages to be studied or to select new Web pages to be studied by a focus group.

The administration screen also enables a moderator to select from among various tasks or to create a new task and to modify the various parameters of a particular focus study session, such as by enabling or disabling voting, enabling or disabling chatting with the client, enabling or disabling comments, or forcing comments whose frequency is determined by the pages viewed or by a predetermined time increment. The administration screen also provides the moderator with a selected output format that is taken from a plurality of output formats. Such output formats can be designed using, for example Excel® brand spreadsheet software (sold by Microsoft Corp. of Redmond Wash.) to display information in virtually any manner desired by the moderator and/or client.

It is also within the scope of the invention to use the system and method of conducting market research, as summarized above and as explained in detail below, to evaluate items other than a Web page or software products. For example, the system and method of the present invention can be employed to study packaging design, product design, mail-order catalogue layout, instruction manuals and other consumer items, provided that such items are provided online to the recipient computer. In such cases, the methodology would be the same, except that instead of viewing one or more Web pages, the recipients would view the packaging, product, catalogue, manual or other subject matter displayed on the recipient computers via the browser in the recipient computer.

Accordingly, it is an object of the present invention to provide a method and system for conducting market research utilizing a computer network; a method and system for conducting market research in which the responses of the subjects are the research received in real time; a method and system for conducting a focus group survey in which the subject matter of the survey can be changed or forced on the subjects in real time and in which the comments on the subject matter can be forced or collected in real time; and a system and method for conducting a focus group survey which is portable, flexible and whose results can be presented in a "user-friendly" manner.

Other objects and advantages of the present invention will be apparent from the following description, the accompanying drawings and the appended claims.

BRIEF DESCRIPTION OF THE DRAWINGS

FIG. 9 shows a sample report generated by the system of FIG. 1 in a format similar to the real-time display of FIG. 7;

FIG. 14 shows the glimpse view screen of FIG. 13 which has been actuated to display different groupings of data from a focus group;

FIG. 15 shows the glimpse view screen of FIG. 13 with client/moderator comments;

FIG. 16 shows a glimpse view screen of the system of FIG. 1 for use by a client;

FIG. 18 shows a summary sheet graphical user interface display for a moderator for a particular Website;

FIGS. 19, 20, and 21 show a survey which can be used by a moderator in the system of FIG. 1 to obtain data pertaining to respondents of a focus group;

FIG. 23 is a sample report generated by the system of the invention show in FIG. 1;

DETAILED DESCRIPTION

Figure 1:
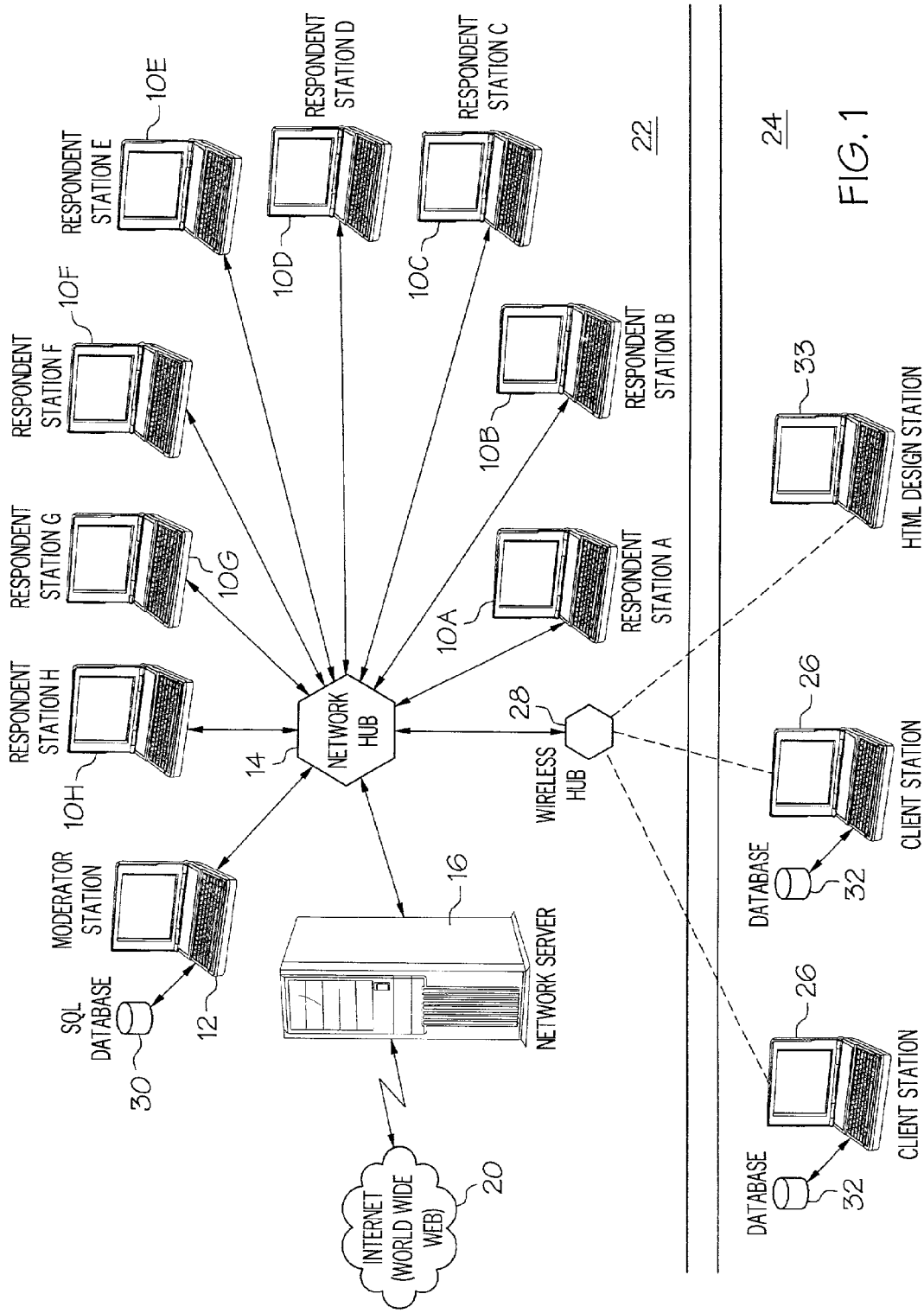
FIG. 1 is a schematic representation of a system embodying the method for performing market research studies on online content according to the present invention.

As shown in FIG. 1, the preferred embodiment of a system according to the present invention includes a plurality of respondent computers 10A–10H and a moderator computer 12 coupled to a network hub (for example, a 3Com Office Connect Dual Speed Hub) 14 that is coupled to a network server 16. The network server 16 provides access for each of the respondent computers 10A–10H to the Internet 20 and also coordinates communication between the respondent computers 10A–10H and the moderator computer 12. The network server 16 also includes proxy server software (such as, for example Wingate by Deerfield) that caches the Web pages to be viewed. Also, the network server includes firewall software that prevents hacking and assigns internet protocol (IP) addresses to all of the computers on the system. Alternatively, each of the respondent computers 10A–10H could be coupled to the Internet via individual data lines (such as telephone lines) and the moderator computer 12 could be operatively coupled to each of the respondent computers via any data connection as known to those of ordinary skill in the art.

Preferably, each of the respondent computers 10A–10H and the moderator computer 12 are positioned in a single room or area 22 so that the operator of the moderator computer can orally communicate with each of the respondents operating his or her respective respondent computer. In another room 24, optional client computers 26 are provided that are operatively coupled, via a wireless connection, to a wireless hub 28, which is in turn coupled to the network hub 14 (although a "hard wired" connection is within the scope of the invention). It is envisioned that the client computers 26 will be positioned in a separate room 24 that is capable of viewing (through a one-way mirror or a video link, for example) the focus group study being performed in the first room 22.

Each of the respondent computers 10A–10H includes a software device that includes a specialized Internet browser, such as Microsoft SQL Server relational database software, for accessing and downloading Web pages from the Internet 20. As will be discussed in further detail below, the specialized browser communicates with a moderator software device, such as Microsoft SQL Server relational database software, resident on the moderator computer 12 to allow the moderator software device to collect quantitative and qualitative data regarding each respondent's activities with respect to the Web pages accessed by his or her respective specialized browser devices and store such information in a database 30. Such data will include, for example, the URL address of each Web page accessed by a respective respondent, qualitative rating signals (such as "like," "dislike," "frustrated" or "confused") generated in response to a particular respondent activating a ratings button on his or her respective specialized browser, various forms of comment data provided by a particular respondent on a respective respondent computer and snapshot images of Web pages visited by each of the respective respondent browsers 10A–10H. The respondent computers 10A–10H each include a register application that points the browser to moderator computer 12 and keys the user to the group and user and that relationship is stored in the moderator database 30. The database (such as an SQL database) 30 may be resident on, or physically remote from but operatively coupled to, the moderator computer 12.

Therefore, the moderator software device is capable of viewing the addresses of the Web pages visited by each of the respondents along with rating signals and comment data provided by the respondents for the particular Web pages visited. These data may be organized and presented in many fashions including user specific, Web page specific, etc. As will be discussed below, the data may be displayed to the moderator on the moderator station 12 in real-time and/or may be presented at a later time to the moderator in the form of a report prepared from the data stored in the database 30.

The software device resident on the moderator computer 12 is also programmed to set up each of the focus group sessions and to initialize the identification data for each of the respondents participating in a particular focus group session. Furthermore, the moderator software device will include one or more Web page addresses defined therein so that the moderator software device may command each of the respondent computers to link to the specified Web page when desired. Therefore, the moderator is capable of taking the entire focus group to a particular Web page at any time.

The client stations 26 each also preferably include a database 32 and include software devices similar to the moderator software device, except that the client computers are preferably unable to direct the respondent computers to any particular Web site and further, the client computers are preferably not capable of setting up a focus group session or the data for any specific respondent. Therefore, the client stations 26 are merely provided so that the client or clients (the party or parties for whom the study is being conducted) will be able to view the qualitative data collected by the moderator station 12 in real-time during the focus group session and/or view reports prepared on the data stored in the database 30. The clients at the client computers 26 may also have the ability to communicate with the moderator at the moderator computer (over the network, telephone or over a radio link, for example, via instant messenger) to direct the moderator to change or modify the course of the ongoing focus group session.

In certain embodiments of the present invention, an HTML editor station 33, operatively coupled to the network server 16 via hubs 28, 14, is provided so that the client will have the ability to create or modify certain HTML pages that will be stored on the network server 16. Such custom pages are accessible for download from the network server 16 (rather than from the Internet 20) by the respondent computers 10A–10H during the focus group session. With this editor station 33, the client will be able to test out quick modifications to problematic pages encountered by the focus group, for example, during the focus group session.

While the invention is described above as utilizing a single moderator computer 12, it is within the scope of the invention that several moderator computers may be utilized so that several moderators can assist in conducting the focus group session. With such a configuration, each of the plurality of moderator computers may operate on its own database 30, or may share a database accessible by all the moderator computers. Likewise, while the invention is described above as utilizing a plurality of respondent computers 10A–10H, it is within the scope of the invention that the focus group session may involve as few as one respondent computer, where the moderator and respondent would perform a one-on-one type study. Of course, it is to be understood that while only eight respondent computers are shown in the embodiment described above, it is within the scope of the invention to involve any number of respondent computers capable of being supported by the associated hardware (the network server 16 and network hub 14, for example) and the associated software.

Figure 2:
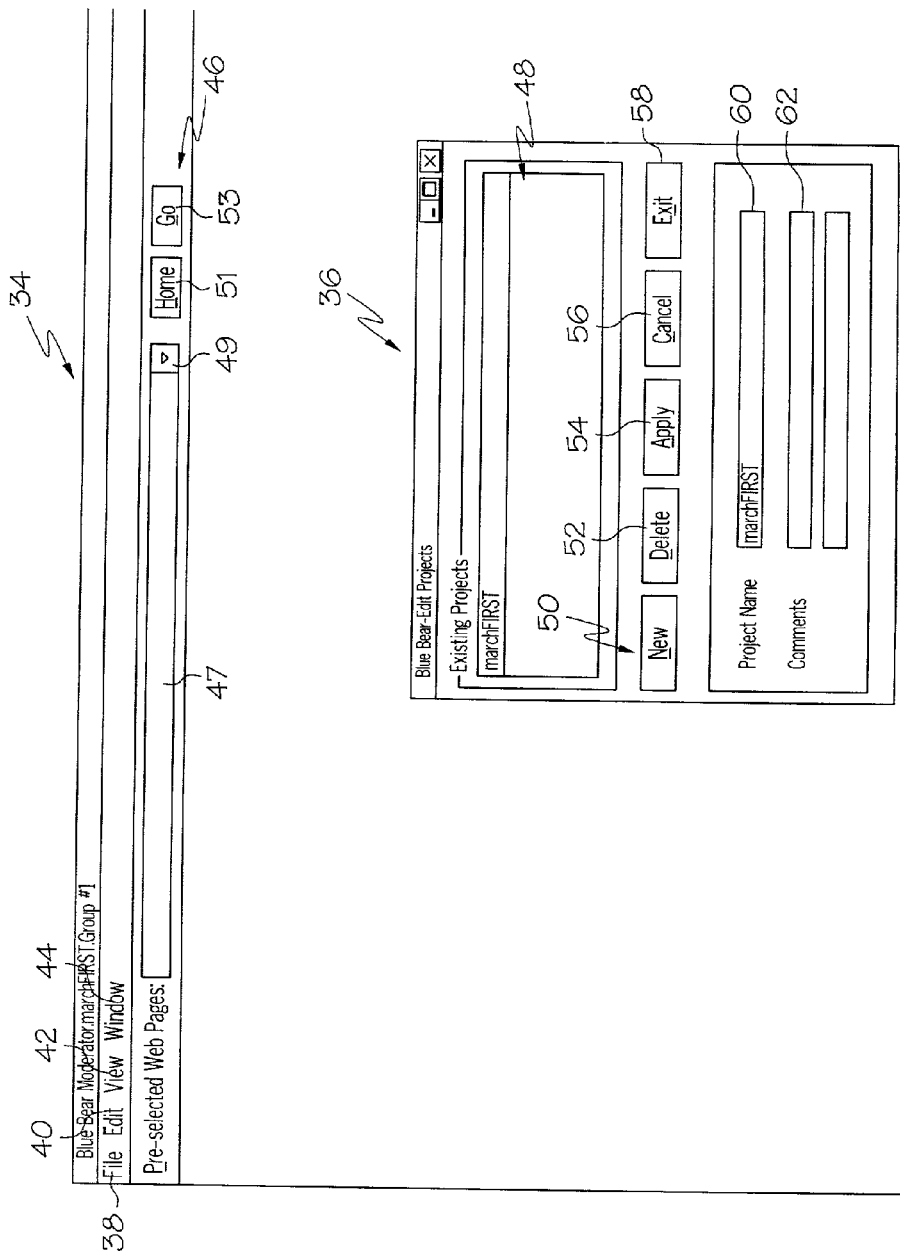
FIG. 2 shows a graphical user interface of the system of FIG. 1.

Before a focus group session is to take place, the moderator software device will first set up a project, the focus groups for the project, and the individual respondents for each of the focus groups set up for the particular project. FIG. 2 illustrates the graphical user interface 34 of the moderator software device displaying a form (window) 36 for establishing and editing focus group projects. Interface 34, as well as all of the interfaces described herein, may be created by Microsoft Visual Basic.

The graphical user interface 34 of the moderator software device will include pull-down menus including a "File" menu 38, an "Edit" menu 40, a "View" menu 42 and a "Window" menu 44. The graphical user interface of the moderator software device also includes a Web page director bar 46 that allows the moderator to direct the respondent computers to predefined Web pages on the Internet. The Web page director bar 46 includes a field 47 into which the moderator can view or edit a URL address for a Web page. If more than one URL is stored, activation of the scroll icon 49 will create a window from which the moderator can select a URL from a list of pre-defined URLs. The Web page director bar 46 also includes a "Home" button 51 and a "Go" button 53. Activation of the "Home" button 51 will cause the moderator software device to command all of the respondent browsers immediately to go to the Web page that is pre-defined in the moderator computer as the "Home Page" (defining the Home Page is discussed below with respect to FIG. 3). Activation of the "Go" button 53 will cause the moderator software device to command all the respondent browsers immediately to go to the Web page having a URL appearing in the edit/select field 47.

Under the "Edit" menu 40, the moderator may select from a number of menu options, one of which is to edit or create a new project. The project edit/select form 36 includes a window 48 listing all of the projects that have been set up in the particular moderator software device. Standard buttons 50–58 are provided below the window 48 where the moderator can specify that he or she wants to create a new project (50), delete an existing project (52), apply edits to an existing project (54), cancel edits to an existing project (56) or exit the edit/create project window (58). Below the buttons are provided fields where the moderator can edit the project name 60 and provide comments regarding the particular project 62.

Figure 3:
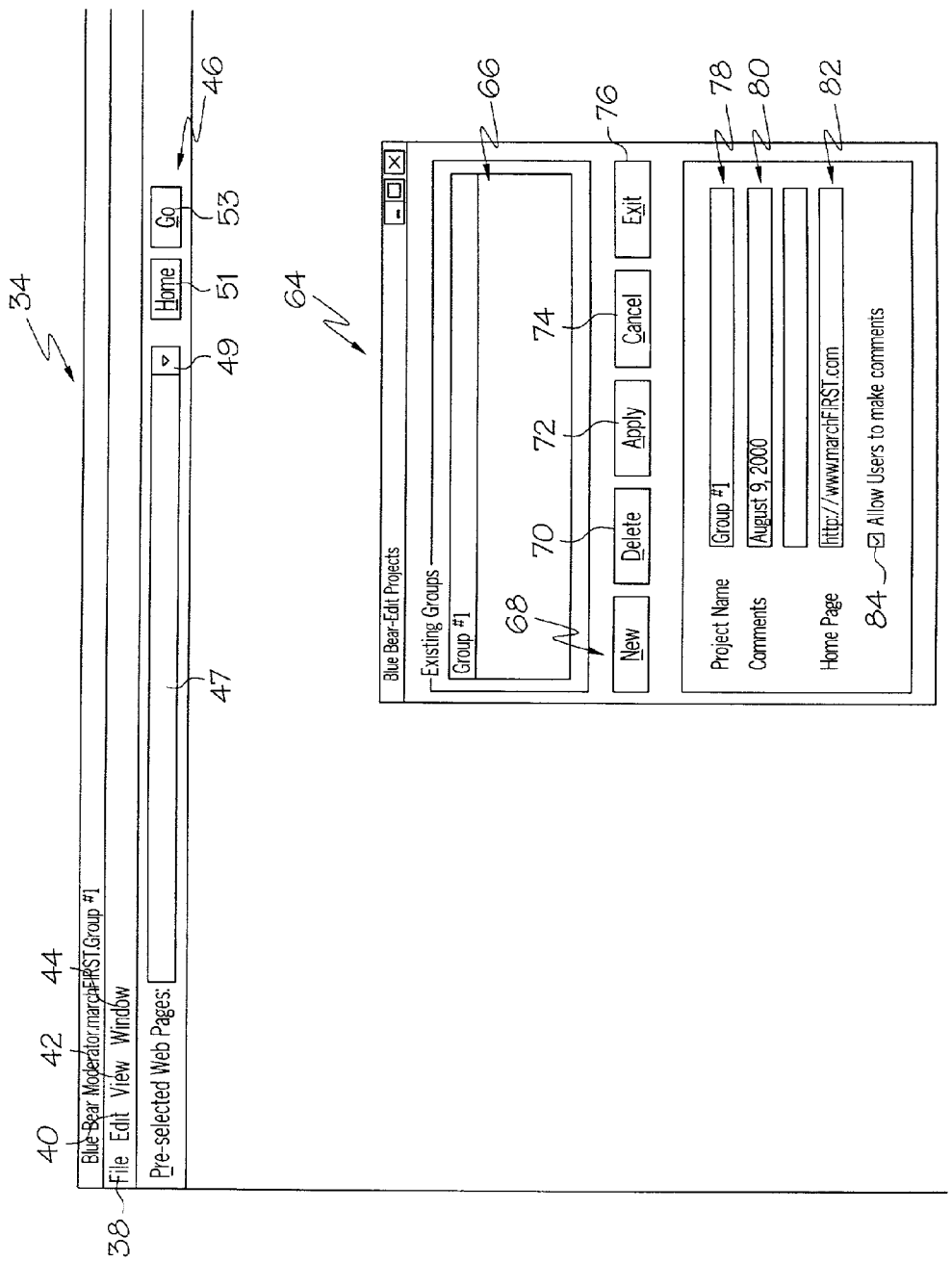
FIG. 3 shows a form or window for creating or editing a new focus group of the system of FIG. 1.

As shown in FIG. 3, once a project has been established, the moderator will then be provided a form or window 64 for creating or editing a new focus group. This form or window 64 will include a window 66 listing all of the predefined focus groups and a plurality of buttons 68–76 below the window for creating a new focus group (68), deleting an existing focus group (70), applying edits to an existing focus group (72), canceling edits to existing focus group (74) and exiting the edit/create focus group window (76). Below these buttons are fields where the moderator can edit the name of the focus group 78, edit comments with respect to the focus group 80 and select a start page ("Home Page") for the particular focus group 82 (the start page is a URL address where each of the focus group respondents will be initialized at the beginning of the focus group session). Below these fields is a toggle field 84 that allows the moderator to indicate whether the respondents will be allowed to make comments on their specialized browsers.

Figure 4:
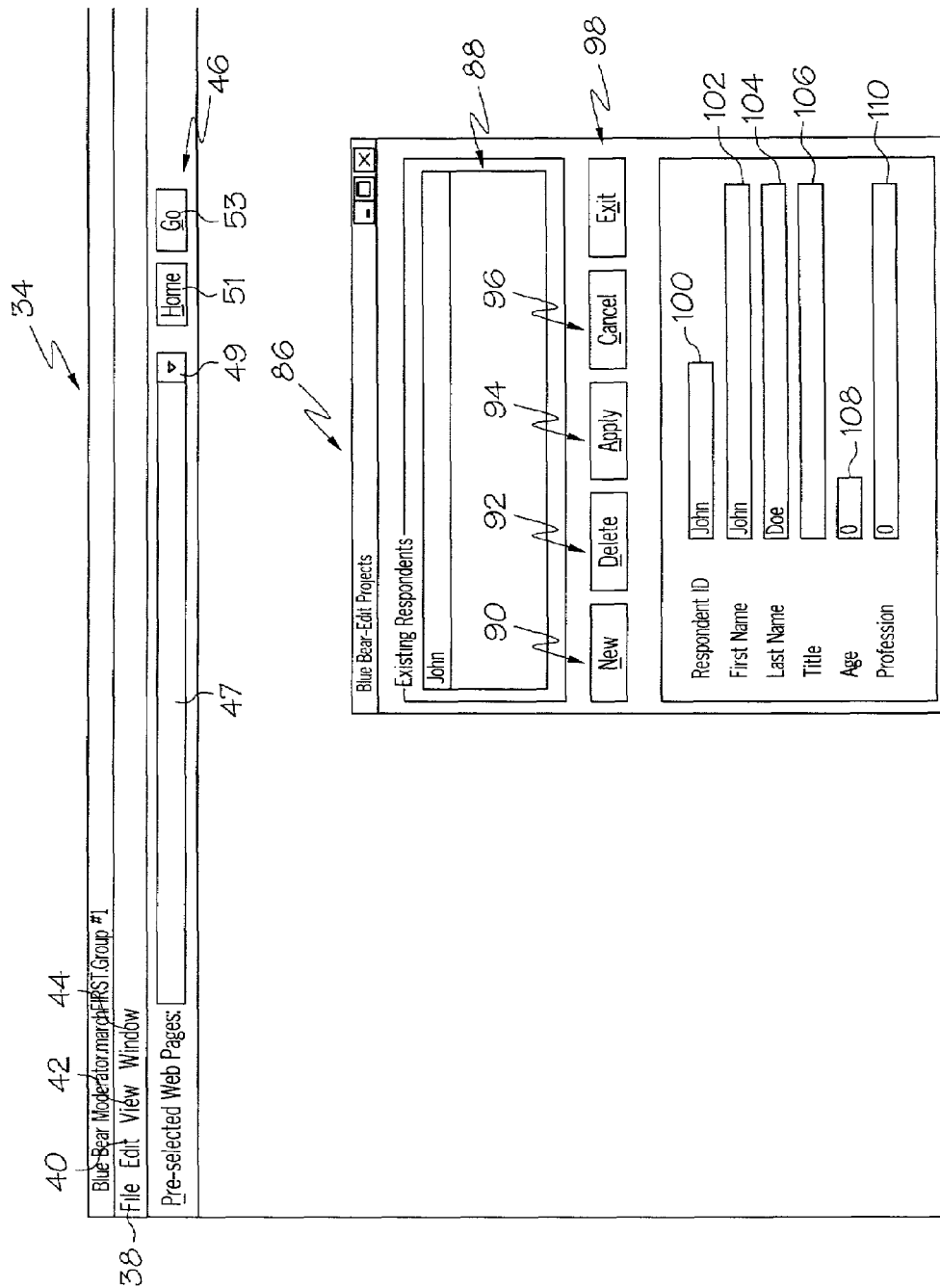
FIG. 4 shows a form or window that will allow a moderator to create or edit respondent information in the system of FIG. 1.

As shown in FIG. 4, once the particular focus group has been set up, the moderator will be provided with a form or window 86 that will allow the moderator to create or edit respondent information for each of the respondents designated for a particular focus group. The form 86 will include a window 88 that lists all of the pre-existing respondents, and below the window are provided a plurality of buttons 90–98 for creating a new respondent (90), deleting an existing respondent (92), applying edits to an existing respondent's data (94), canceling edits to an existing respondent's data (96) and exiting the edit/create respondent data window (98). Below these buttons are several fields 100–110 for editing the respondent's ID (100), editing the respondent's first name (102), editing the respondent's last name (104), editing the respondent's title (106), editing the respondent's age (108), and editing the respondent's profession (110).

Once a focus group has been set up for a particular project, the moderator is then able to conduct a focus group study using a plurality of respondents stationed at the plurality of respondent computers 10A–10H (see FIG. 1). The respondent computers 10A–10H may be set up by the moderator prior to the respondents' entering the study room; or alternatively, each of the respondents can be required to log on to his or her respective respondent computer himself or herself, each selecting a specified respondent ID set up by the moderator. Once the focus group session starts, each of the respondent's specialized browsers will access and download the Web page at the URL designated in the Home Page field 82 of the moderator's edit/create group form 64 (see FIG. 3).

Figure 5:
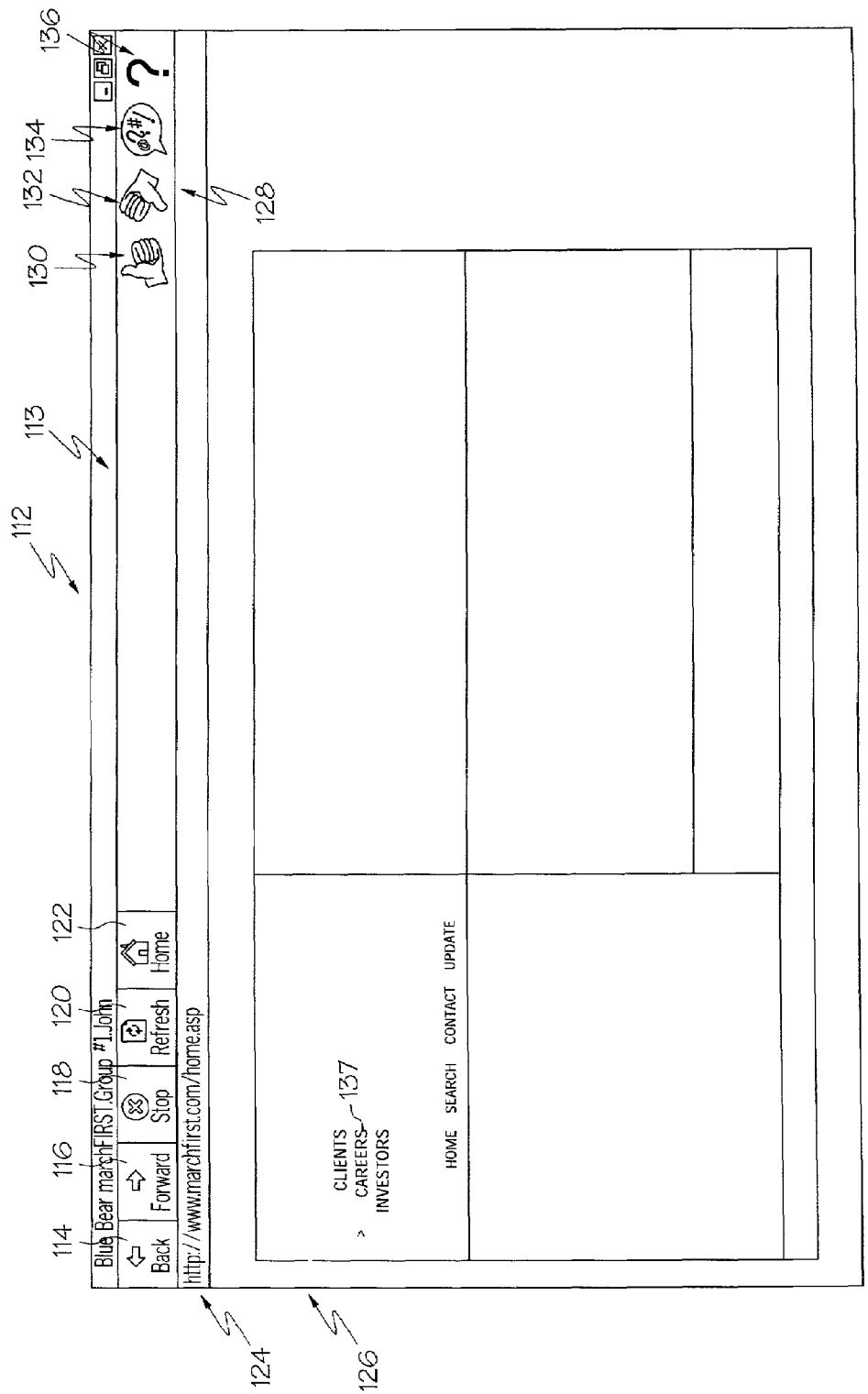
FIG. 5 shows a typical graphical user interface of the respondent browser of the system of FIG. 1.

FIG. 5 provides an illustration of the graphical user interface of the specialized respondent browser 112 according to a preferred embodiment of the present invention. The graphical user interface 113 of the specialized respondent browser includes standard Web browsing buttons 114-122 such as Back (114), Forward (116), Stop (118), Refresh/Reload (120) and Home (122). Additionally, the specialized browser will include a field 124 indicating the present URL address and a window 126 for displaying the Web page at the URL address listed in the field 124. The graphical user interface of the specialized browser 112 will also include a plurality of qualitative rating icons or buttons 128 which include a "Like" rating button 130, a "Dislike" rating button 132, a "Frustrated" rating button 134 and a "Confused" rating button 136.

The moderator will direct each of the respondents to perform a particular task on the Web site, such as finding particular information. During the course of performing this task, each of the respondents will use the hyperlinks provided on the Web pages to navigate through the particular Web site and the moderator will ask the respondents to rate the Web pages visited during the course of performing the task by activating one or more of the ratings buttons 128 on any or all of the Web pages visited during the task. Alternatively, the specialized browser 112 can be set-up to require the respondent to activate one of the ratings buttons 128 before linking to another Web page or before allowing any of the hyperlinks (e.g., "CAREERS" link 137) to become active.

Figure 6:
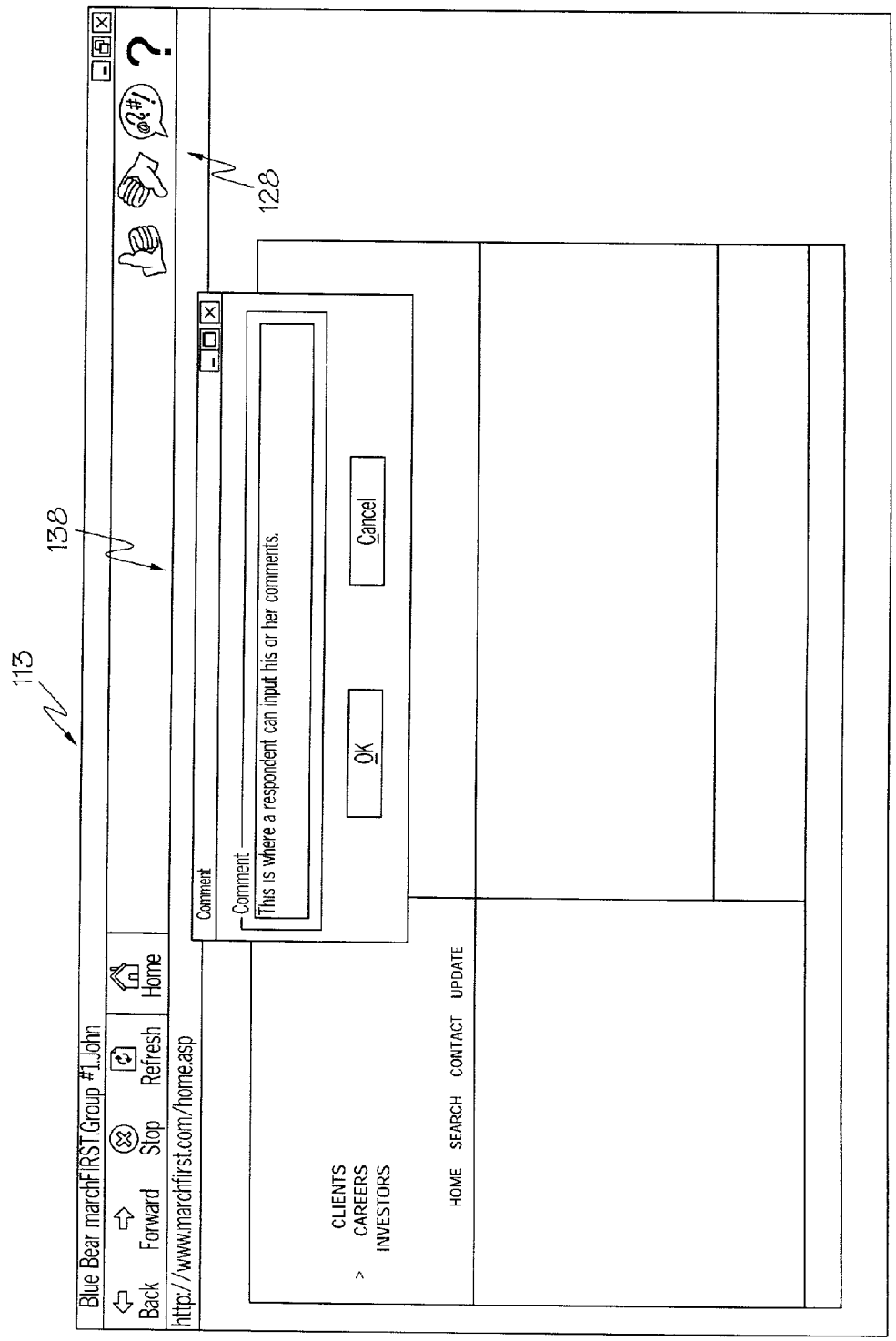
FIG. 6 shows a form or window into which a user may enter comments responsive to activation of rating button of the system of FIG. 1.

As shown in FIG. 6, if the respondents are permitted to make comments, the specialized browser 112 will provide a form 138 into which the user may enter comments responsive to the user activating one of the rating buttons 128.

Figure 7:
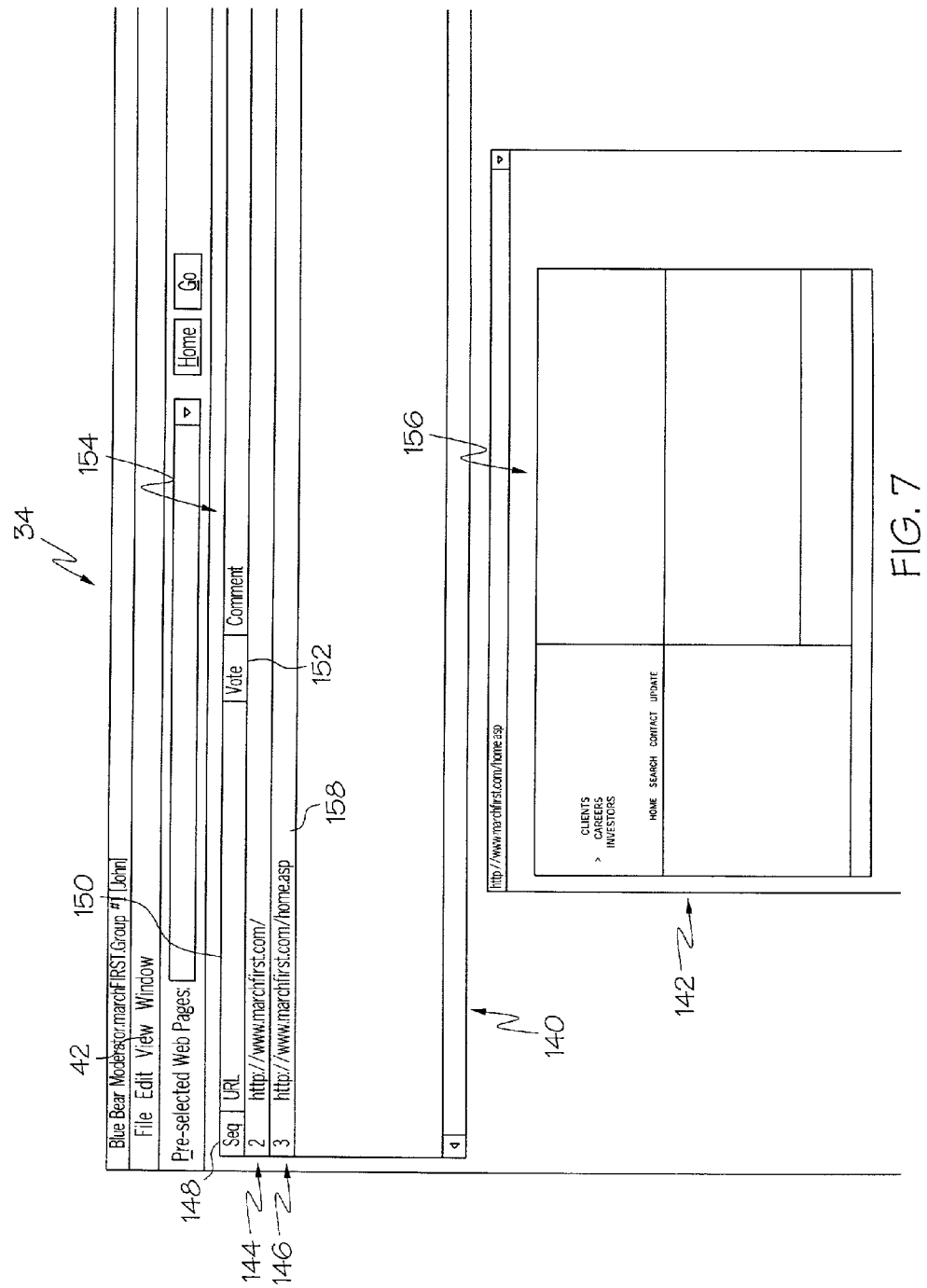
FIG. 7 shows a graphical user interface available to the moderator of a system of FIG. 1, in which a selected one of the respondents is displayed with respect to Web pages visited and a snapshot of the Web page.

As shown in FIG. 7, using the View menu 42 provided on the moderator's graphical user interface 34, the moderator can select one of the respondents and view data received from the selected respondent's specialized browser in real-time during the particular focus group session. The display screen shown in FIG. 7 includes a data window 140 and in image window 142. The data window includes entries 144, 146 for each of the Web sites visited by the selected respondent during the particular focus group session. Each entry 144, 146 provides a field for displaying the sequence number 148 for the particular Web page visited, the URL of the particular Web page visited 150, the qualitative rating entered by the respondent for the particular Web page visited 152 and the comment provided by the respondent for the particular Web page 154. Additional data fields may include the time spent on each Web page. The image window 142 provides a snapshot of the Web page highlighted by highlight bar 158 in the data window 140.

Figure 8:
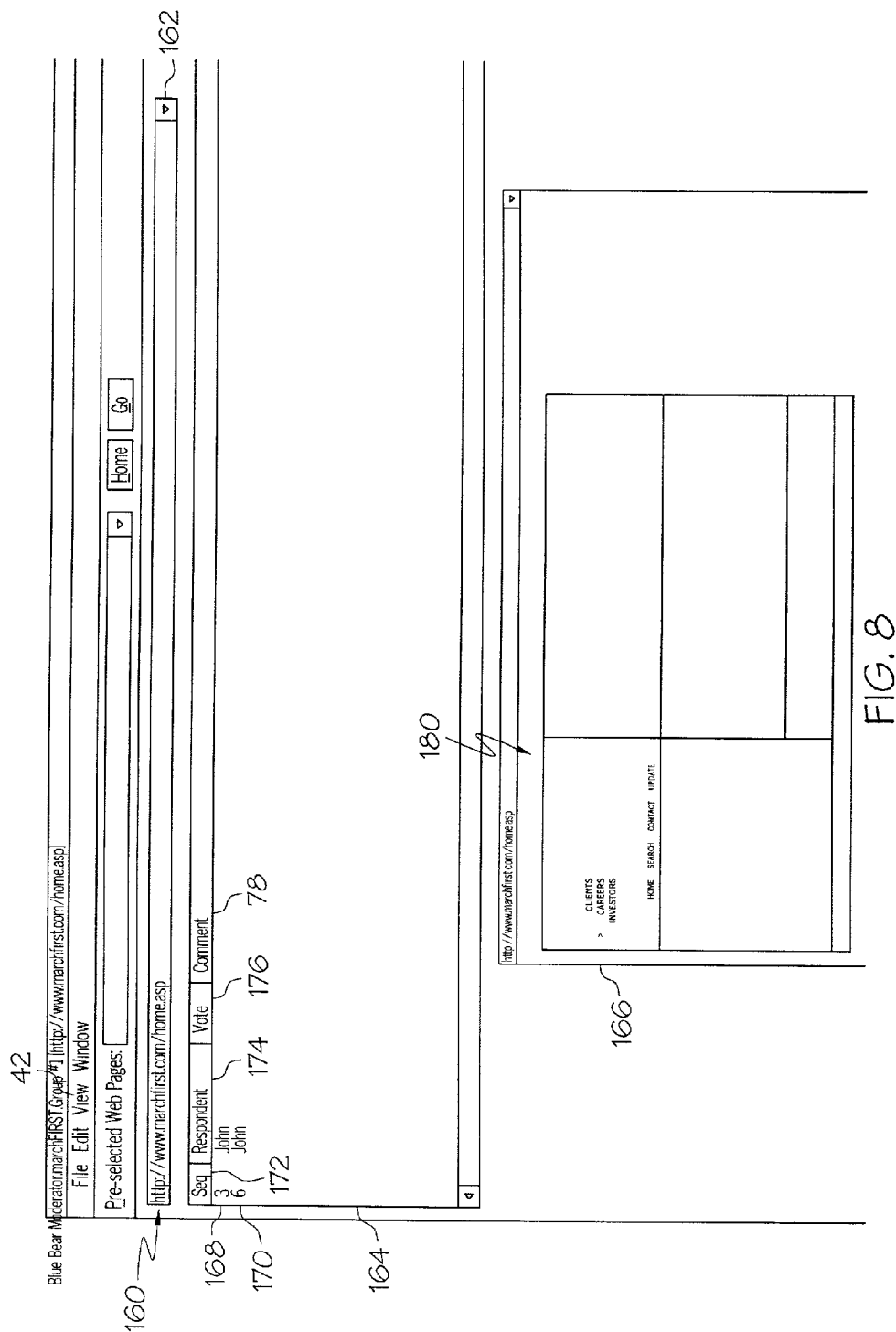
FIG. 8 shows another graphical user interface of the system of FIG. 1 which displays a particular respondent and a Web page visited by that respondent.

FIG. 8 presents an alternate moderator viewing capability, accessible using the "View" menu 42, in which the moderator can view data associated with each individual page visited by the respondents in the focus group (Address-Specific). This display will include a field 160 displaying the URL of the Web page for which focus group data are being displayed in the fields below it. This field 160 also includes a scroll button 162 that allows the moderator to select other Web pages visited by respondents during the focus group study. Below the URL field 160 is a data field 164 and an image field 166. Each line 168, 170 in the data field 164 provides data for each time that one of the respondents visits the URL listed in the URL field 160. The data provided on each line 168, 170 include a sequence number 172, a respondent ID 174, a rating 176 given by the respondent and a comment 178 provided by the respondent. It is also possible that the data field include the time spent by the respondent at the particular address during the particular sequence. Below the data field 164 is an image field 166 that displays a snapshot 180 of the Web page listed and highlighted in the URL field 160.

FIG. 9 provides an example report, in a similar format (respondent-specific) as the real-time display of FIG. 7. The report is prepared from data taken from the database 30 (see FIG. 1) after (or during) a focus group session. The report includes lines 182, 184, 186, 188, 190, 192, 194 for each of the Web sites visited by the selected respondent during the particular focus group session. Each line 182–194 provides a field for displaying the sequence number 196 for the particular Web page visited, the URL of the particular Web page visited 198, the qualitative rating entered by the respondent for the particular Web page visited 200 (1="Like", 2="Dislike" & 3="Frustrated"), the comment provided by the respondent for the particular Web page 202 and the time spent on each Web page 204.

Figure 10:
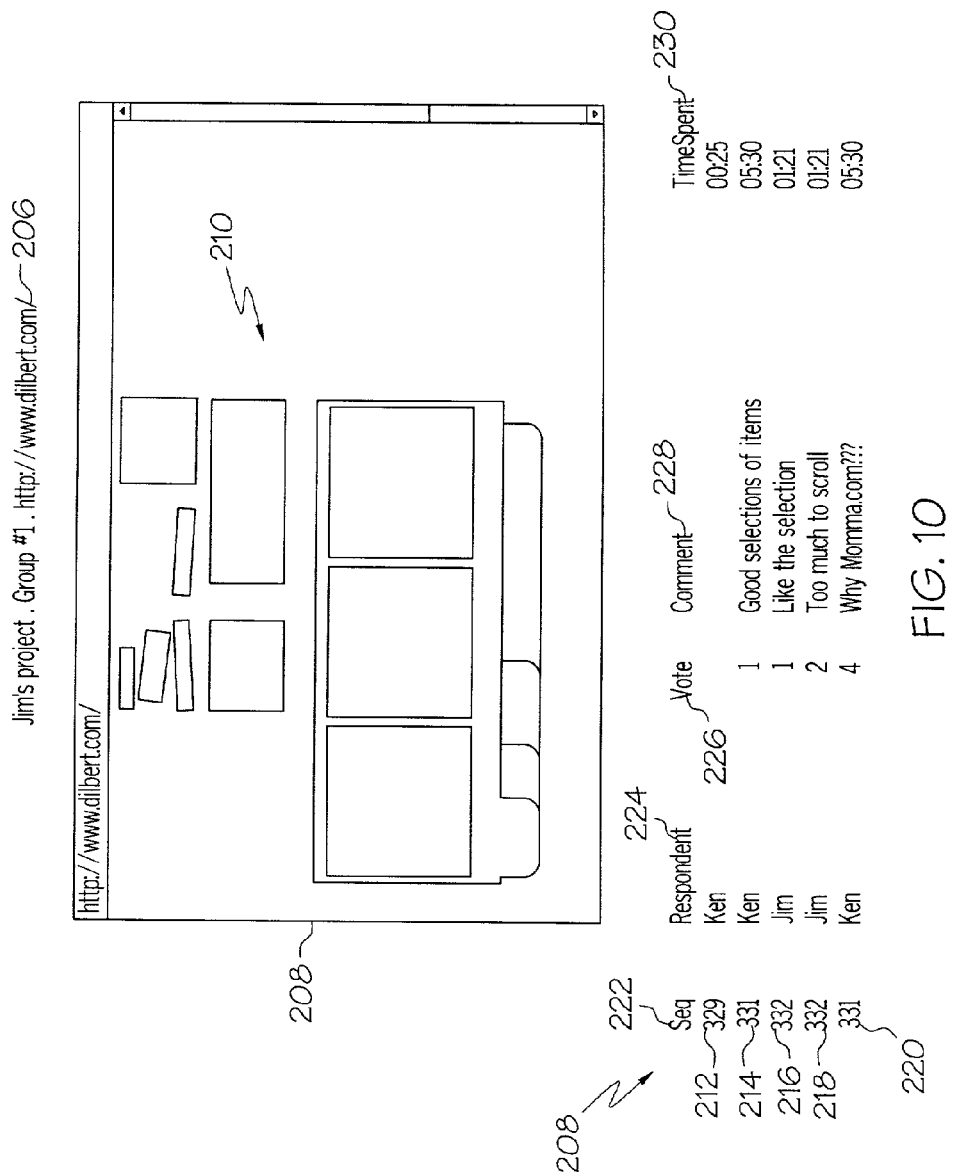
FIG. 10 shows another report format of the system of FIG. 1 in which a particular Web page is shown along with the respondents and other data pertaining to the activities and responses of the respondents.

FIG. 10 provides an example report, in a similar format (address-specific) as the real-time display of FIG. 8. The report is prepared from data taken from the database 30 (see FIG. 1) after (or during) a focus group session. This report will include a field 206 illustrating the URL of the Web page for which focus group data is being presented below. Below the URL field 206 is an image field 208 and a data field 210. The image field 208 displays a snapshot 210 of the Web page listed in the URL field 206. Each line 212, 214, 216, 218, 220, 210 in the data field provides data for each time that one of the respondents visited the URL listed in the URL field 206. The data provided on each line include a sequence number 222, a respondent ID 224, a rating given by the respondent 226, a comment provided by the respondent 228, and the time spent by the respondent at the particular address, during the particular sequence 230.

Figure 11:
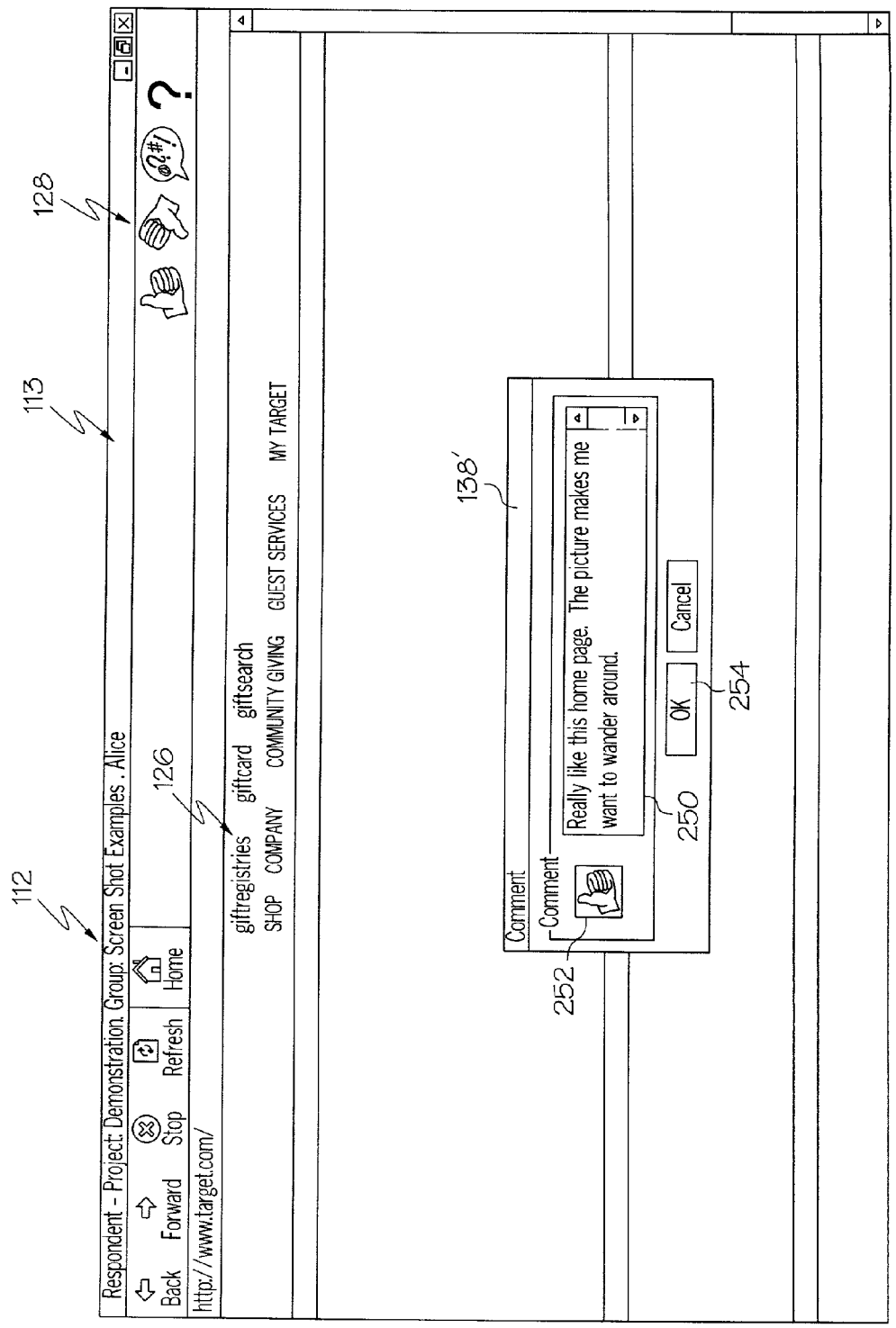
FIG. 11 shows a graphical user interface of the system of FIG. 1 with a comment window.

As shown in FIG. 11, the graphical user interface 113 and browser 112 may be modified to provide a form 138' which includes a box 250 for a respondent comment on the particular page being viewed and an icon 252, which corresponds to of the icons 128 in the graphical user interface. As a result, when the respondent "presses" one of the icon/buttons 128 that act automatically brings up form 138' with the activated icon 252 present. Once the comment has been entered by the respondent in the window 250, the respondent then depresses the "OK" button 254 to close the form and proceed.

Figure 12:
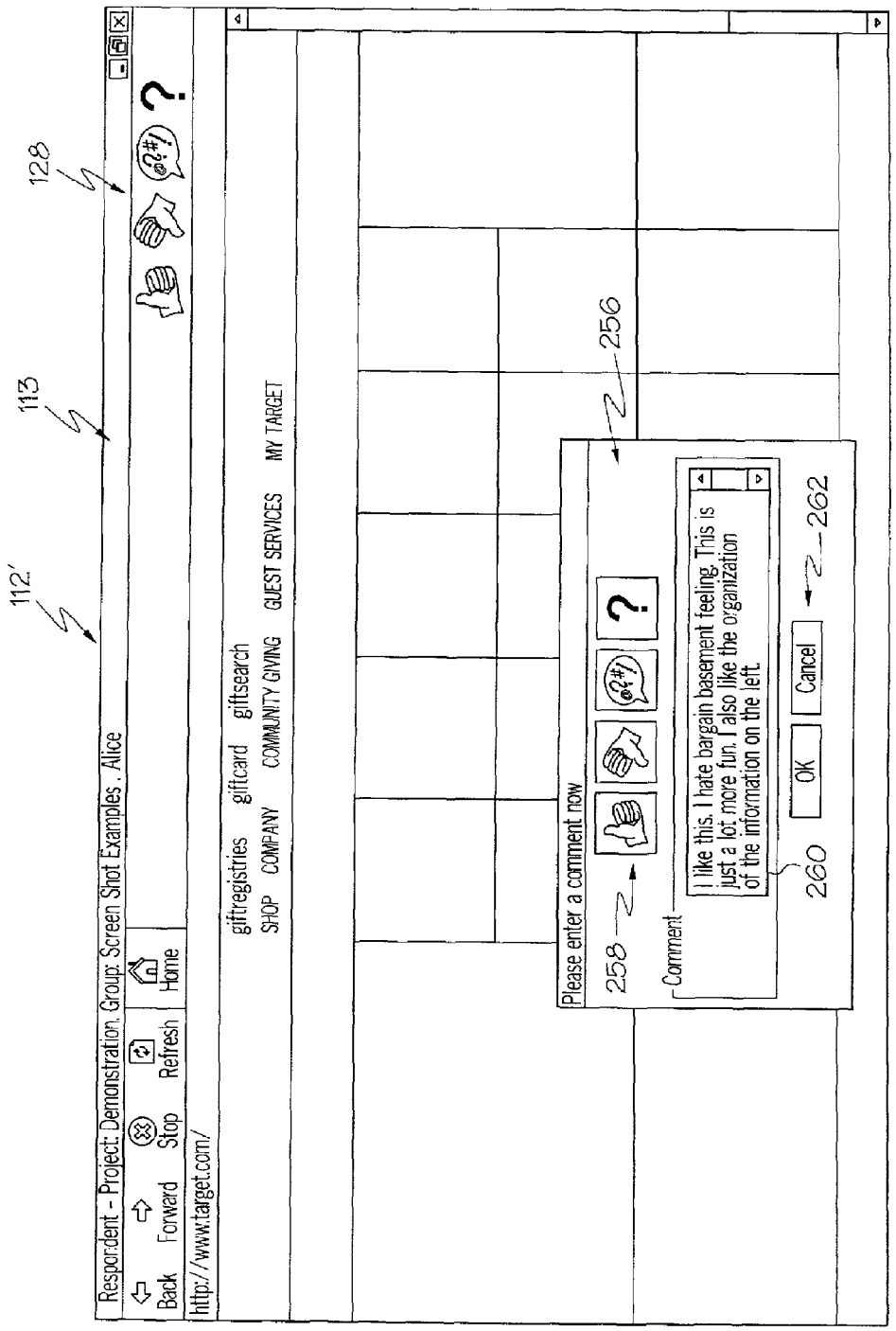
FIG. 12 shows a graphical user interface of the system of FIG. 1 with a second type of comment window.

As shown in FIG. 12, an alternate embodiment of the browser 112' includes the capability of providing a form 256 which is "forced" by the moderator upon one or more respondents, at the discretion of the moderator. Form 256 includes the icon/buttons 128 as buttons 258, a comment box 260 and "OK/Cancel" button choice 262. In this fashion, the moderator can, at a preselected time determined by the moderator, query the selected participants to obtain their present sense impressions of a particular page being viewed. The form 256 appears on the selected respondent computers 10A–10H and the designated respondents must respond and provide comments before navigating further.

Figure 13:
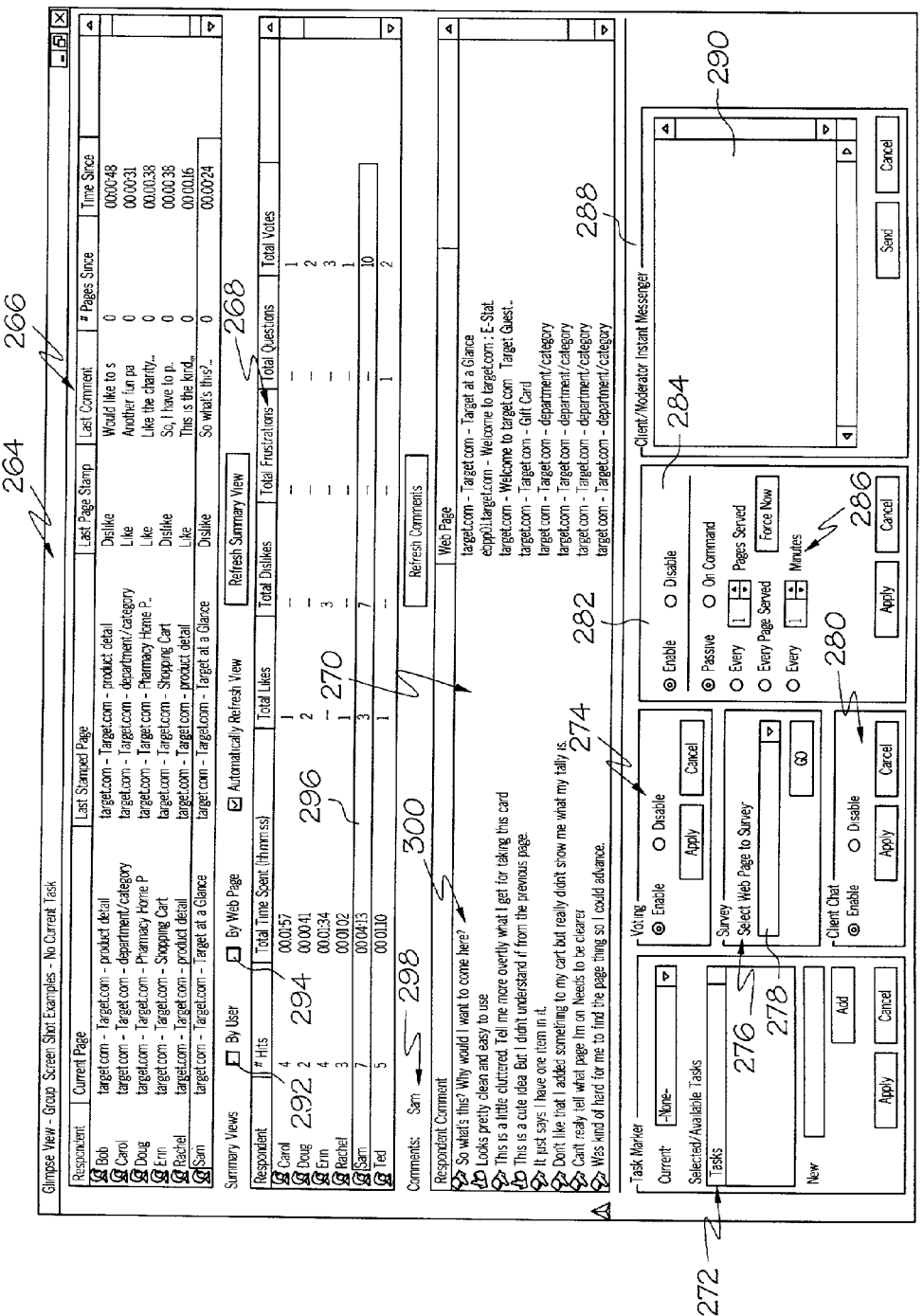
FIG. 13 shows a moderator glimpse view screen of the system of FIG. 1 which displays in real-time the activities of a particular focus group.

As shown in FIG. 13, in an alternate embodiment of the invention, the moderator station 12 (see FIG. 1) includes software that generates a "glimpse view screen" 264. The glimpse view screen 264 enables a moderator to view the activity of the entire focus group on a single screen. Specifically, the glimpse view screen shown in FIG. 13 includes a top window 266 that shows the name of each respondent, the current page being viewed by the respondent, the last stamped page viewed by the respondent (meaning the last page for which a particular respondent provided a comment) the comment or "stamp" of the respondent with respect to the last page (i.e., whether that particular respondent activated the "like," "dislike," "confused" or "question" buttons), the script of the last comment provided by the recipients, the number of pages since the last comment, and the time elapsed time since the last comment was provided.

Beneath window 266 is window 268 which lists the respondents participating in the particular focus study, the number of hits per respondent (that is, the number of pages viewed), the total time spent by the respondents, the total "like" votes provided by the respondents, the total "dislikes" provided by the respondents, total "frustrated" comments provided by the respondents, the total "questions" provided by the respondents and the total votes provided by a respondent in all categories.

Beneath window 268 is window 270 which provides a comprehensive listing of the comments and associated votes provided by the focus group.

Beneath window 270 are several windows that include buttons that enable the moderator to control the input of data to the database 30 (see FIG. 1). Box 272 is entitled "Task Marker" and lists the current task that has been provided by the moderator to the focus group, and includes "Add", "Apply", and "Cancel" buttons to enable tasks to be added, deleted or modified. Adjacent to box 272 is voting box 274 which enables the moderator to enable and disable voting by the respondents. Box 276 includes a window 278 which enables the moderator to select a particular Web page for the respondents to view. Box 280 enables the moderator to enable or disable chatting by the client; that is, enabler disable the ability of the client to provide instructions or comments.

Box 282 enables the moderator to enable or disable comments in box segment 284, and to force the respondents to provide comments as a condition of progressing to a successive Web page in box segment 286. Box 288 enables the moderator to provide instant messages, set forth in window 290 to the client, and to receive instant messages from the client to the moderator.

In between windows 266 and 268 of the glimpse view screen 264 in FIG. 13 are buttons 292, 294 which enable the moderator to view data summaries by user (button 292) or by Web page (294). The glimpse screen 264 shown in FIG. 13 shows in window 268 summary views by user, since the "By User" button 292 has been activated. By highlighting a particular respondent 296 in window 268, that respondent's name appears at location 298 and all of the comments 300 for that respondent appear in window 270.

Figure 14:
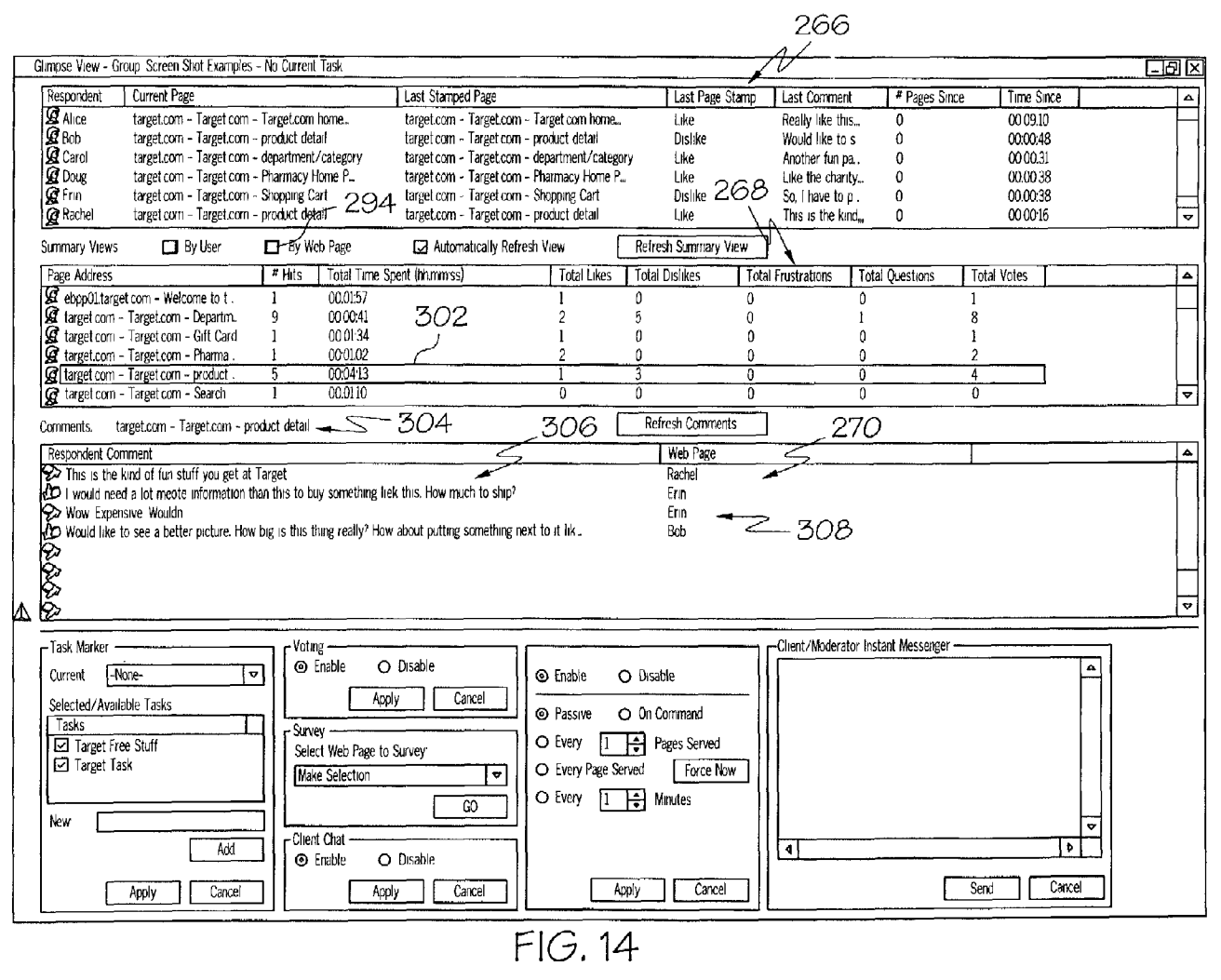

As shown in FIG. 14, when button 294 is depressed, the comments are grouped by Web page in window 268. Consequently, window 268 will show a listing of each Web page viewed by the focus group, the number of individuals of the focus group who have viewed the Web page, the total time spent by all of the respondents, in the aggregate, on the Web pages listed, the total votes ("like," dislike,"frustration" and "question") and total votes for each page. By highlighting a particular Web page 302, that Web page appears at 304 in the comments line beneath window 268 and all of the comments 306 pertaining to that selected Web page 302 appear in window 270. In addition, window 270 lists each respondent in column 308 so that the moderator can determine which respondent made which comment 306 appearing in the window.

Figure 15:
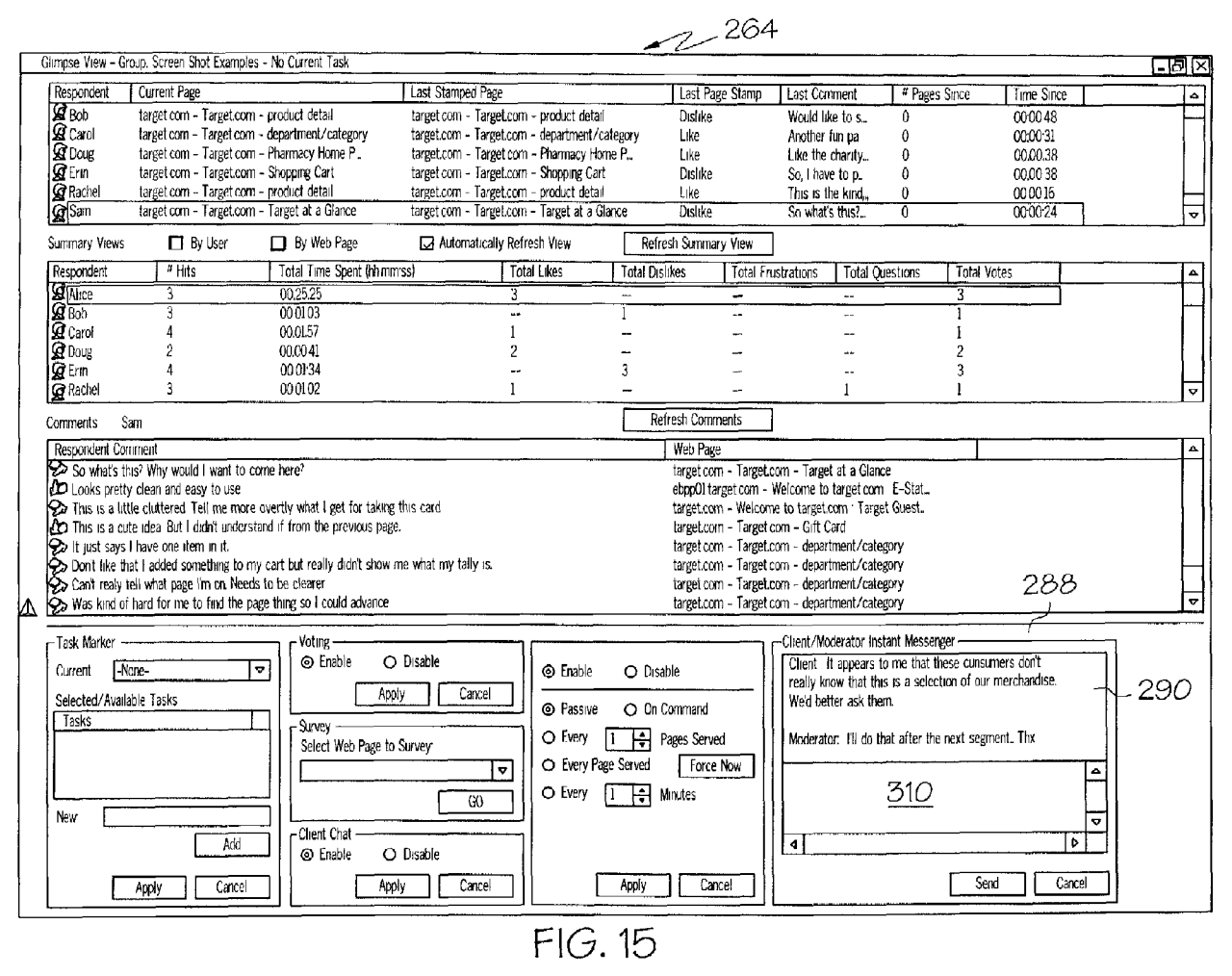

FIG. 15 shows the glimpse view screen 264 in which the client/moderator instant messenger box 288 displays an exchange of instant messages between the client and moderator in window 290. Once instant messages have been exchanged, a sub-window 310 appears that enables the moderator to send additional instant messages to the client while viewing the most recent exchange of correspondence.

Figure 16:
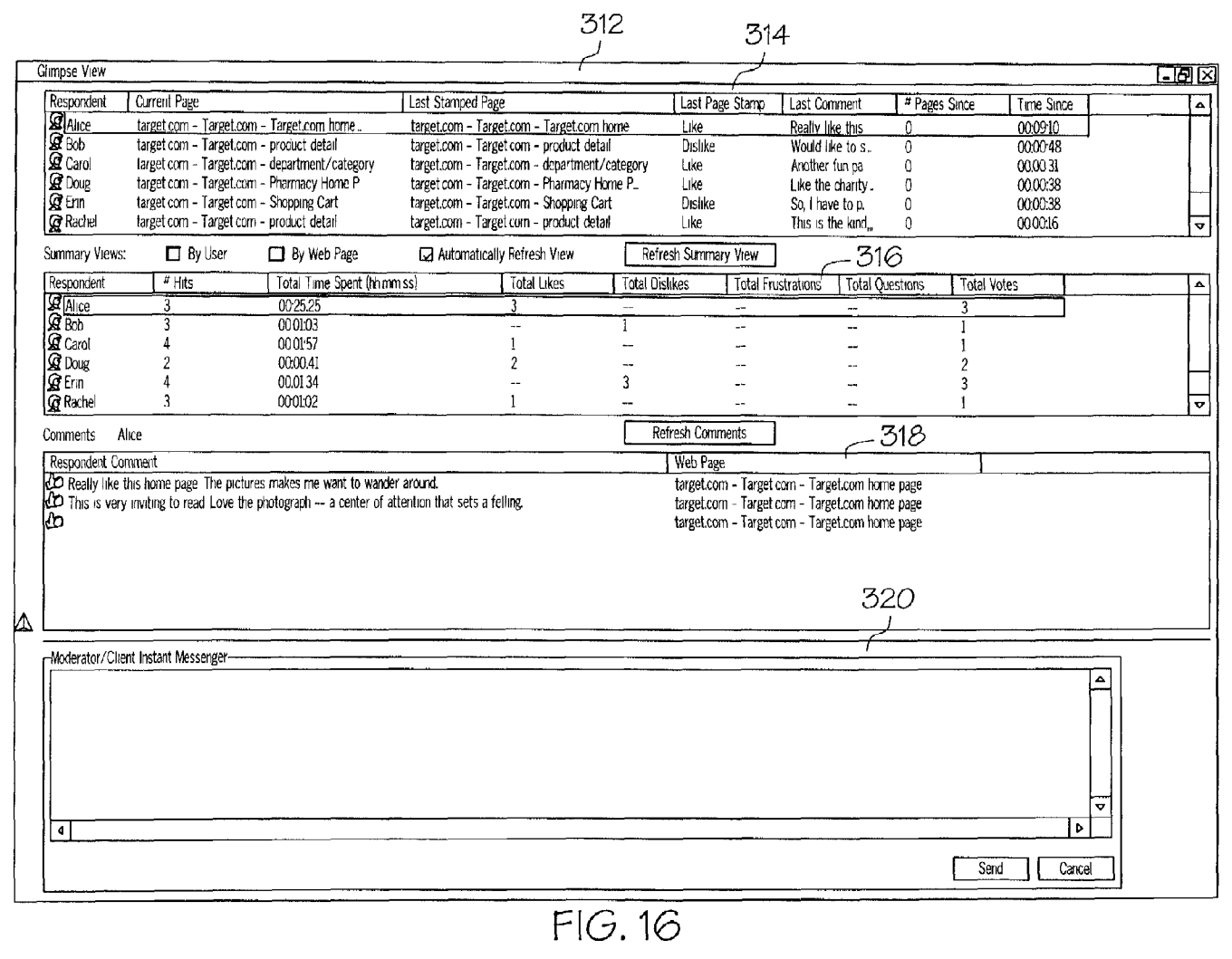

FIG. 16 shows the client screen 312. Client screen 312 includes windows 314, 316, 318 and 320. Window 314 is identical to window 266 of glimpse view screen 264 (see FIG. 13). Similarly, window 316 is identical to window 268 of that glimpse view screen and window 318 is identical to window 270 of that same glimpse view screen. This way, a client can view the activities of the focus group in real time along with the moderator. Window 320 is an instant messenger window that enables the client to exchange instant messages with the moderator. Accordingly, a message entered by a client in window 320 will appear in window 290 of glimpse view screen 264 in FIG. 13.

Figure 17:
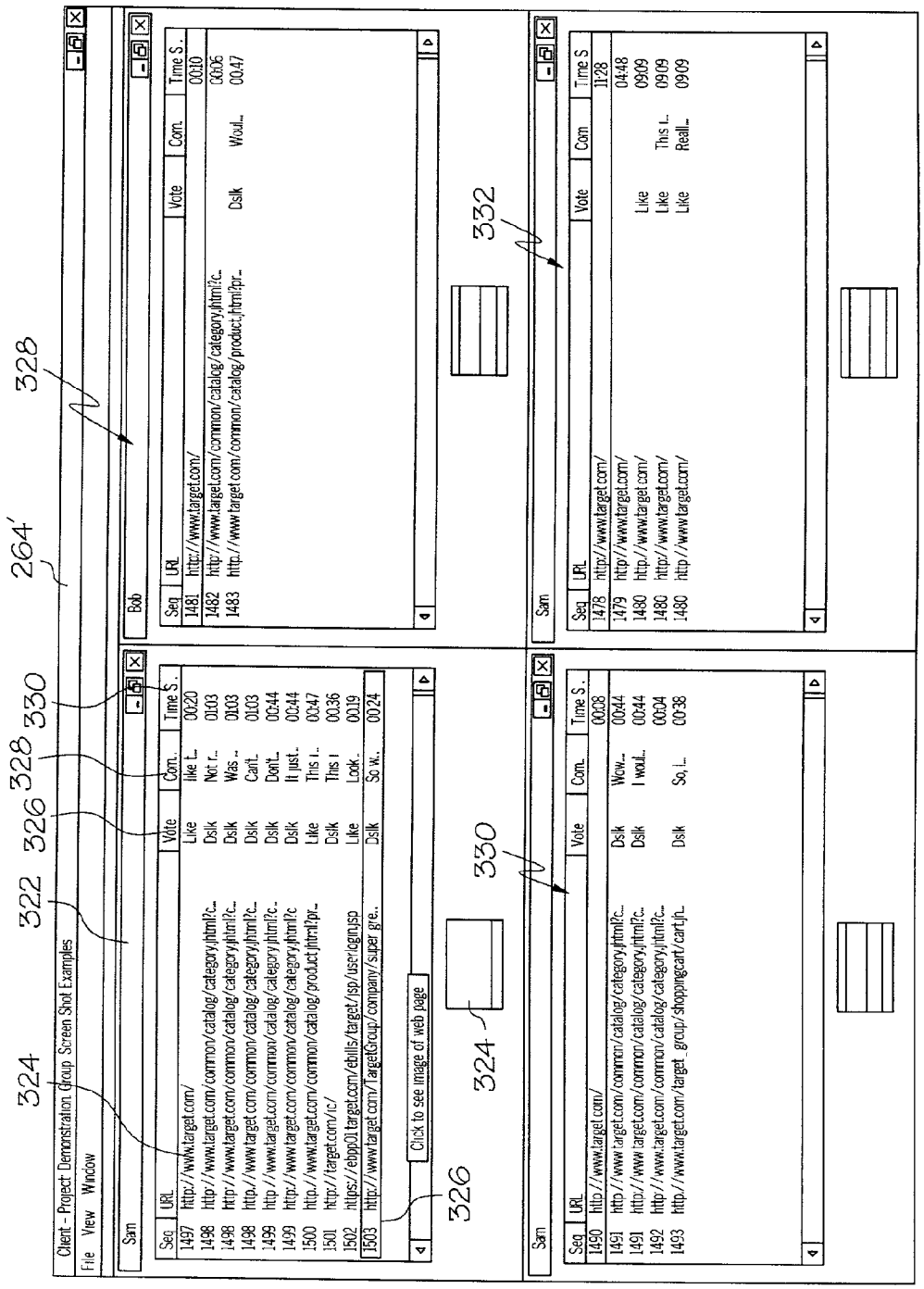
FIG. 17 shows a different display format of the glimpse view screen of FIG. 13 in which individual respondents are shown in tiled arrangement.

FIG. 17 shows an alternate moderator glimpse view screen 264'. Glimpse view screen 264' displays, in vertical, tiled fashion, the activities of, for example, four respondents from a focus group. In this example, window 322 displays the Web pages 324 visited by respondent "Sam," as well as the votes 326, comments 328 and time spent at each page 330 by that particular respondent. In addition, the window 322 includes a sub-window 324 that displays an image of the Web page 326 highlighted in window 322. Windows 328, 330, and 332 have the same information and functionality with respect to respondents "Bob," "Erin," and "Alice."

Figure 18:
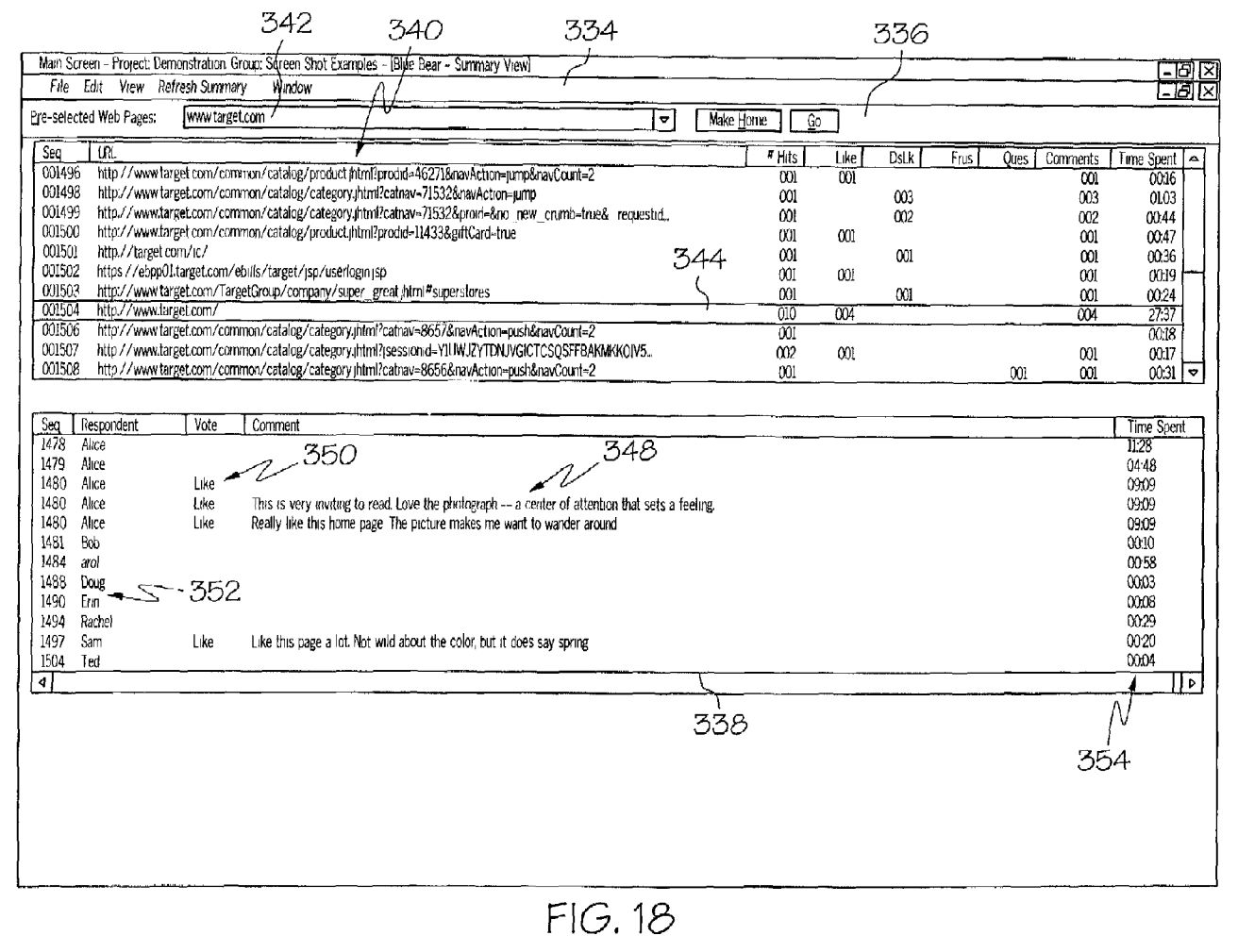

FIG. 18 shows a summary page 334 which is divided into two windows 336, 338. Window 336 shows a complete listing 340 of all of the pages visited at a particular Web site listed in window 342, the time spent by the group, the number of comments each page received, and a summary of the reactions in terms of likes, dislikes, frustrations and questions. When a particular page 344 in window 340 is highlighted, the comments 346 appear in window 338 and are identified by an associated vote 350, the individual respondent 352 making the vote and comment and the time spent 354 by each respondent at that particular page 344.

Figure 19:
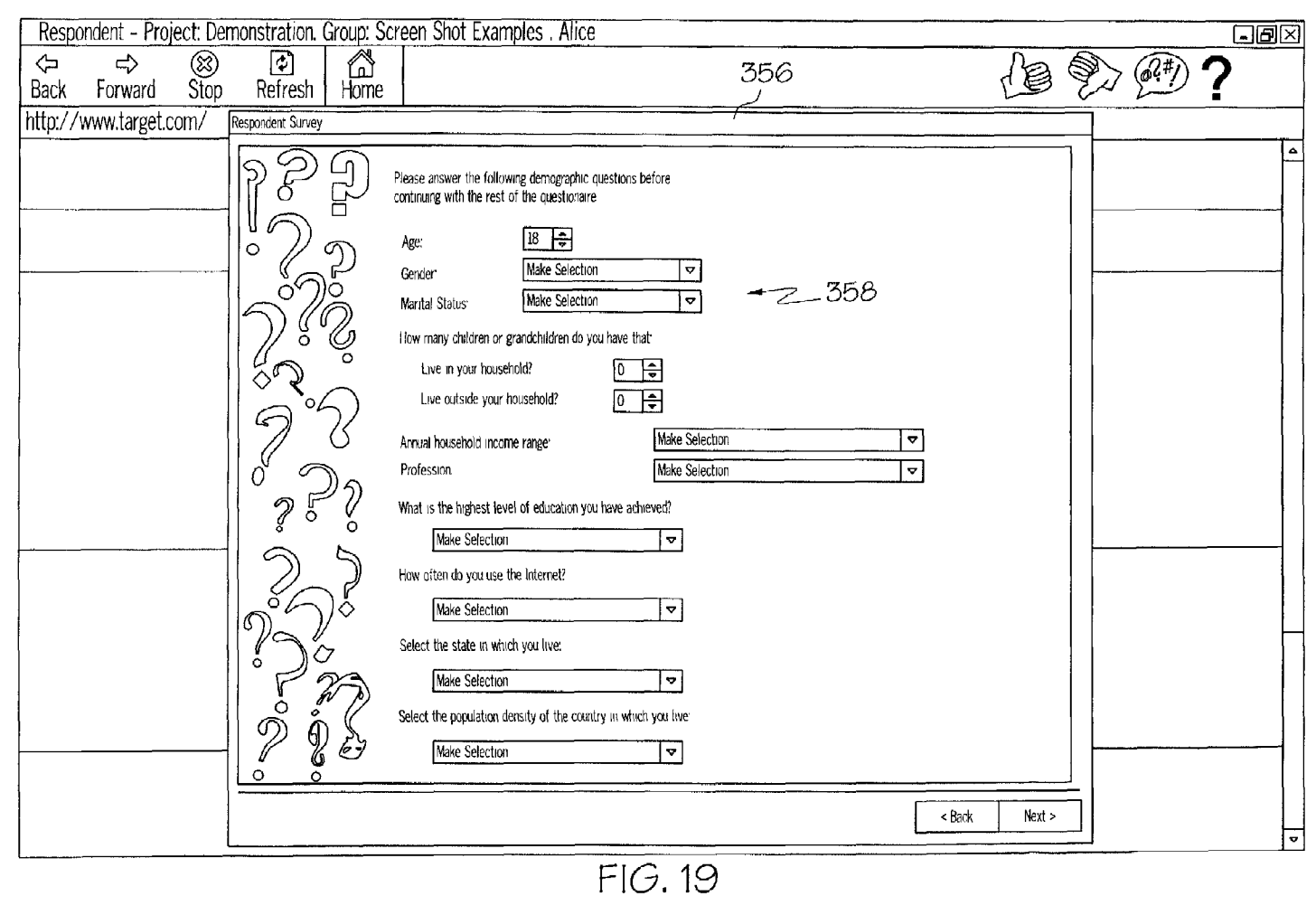
Figure 20:
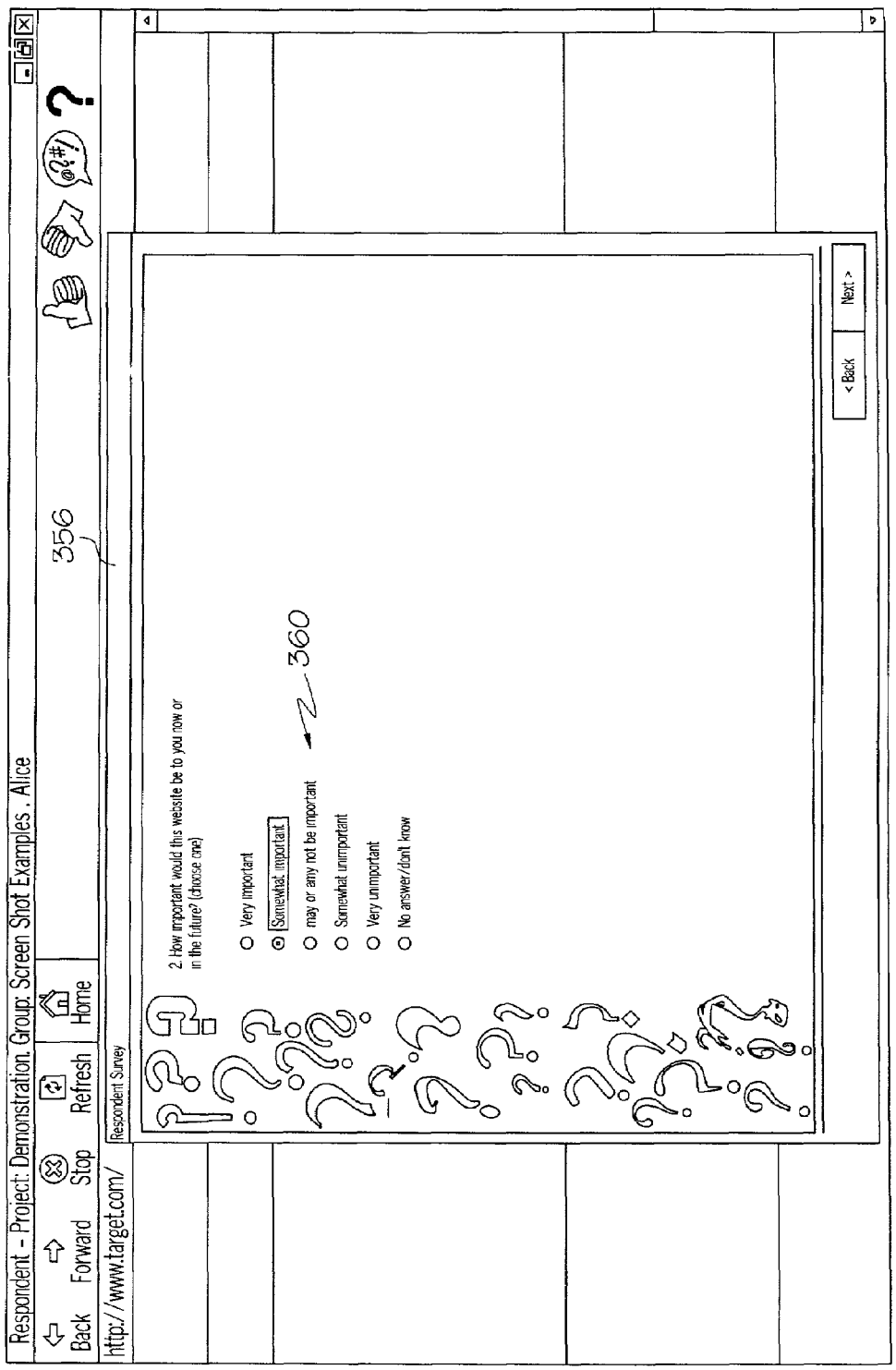

As shown in FIG. 19, in order to gather demographic data from each respondent in the focus group (see FIG. 1), the moderator can send a standardized survey to each respondent. FIG. 19 shows a window 356 that includes a number of questions 358 directed to each respondent. The questions can include personal information, such as age, gender and marital status, educational level, living conditions, location of residence and other questions pertaining to each respondent's family. In FIG. 20, the evaluation portion of the survey begun in window 356 is shown. As part of the survey, each respondent is asked questions 360 concerning his or her reaction to the site being viewed. As shown in FIG. 21, the survey set forth in 356 also includes a number of questions regarding various attributes of the particular Web site to be studied.

Figure 22:
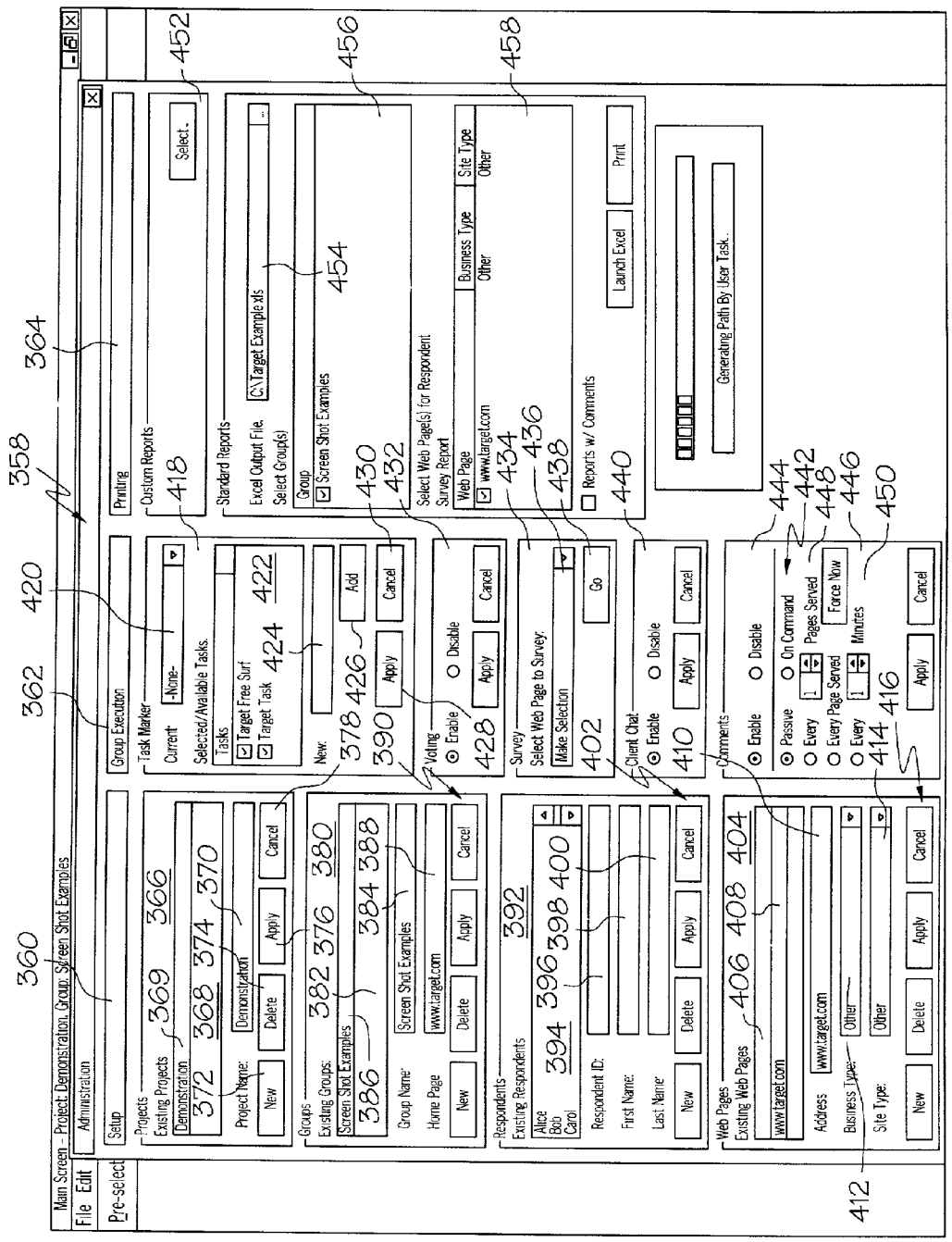
FIG. 22 displays an administration screen used by a moderator to set and launch a particular study in the system of FIG. 1.

FIG. 22 shows a moderator's administration screen 358. Screen 358 is divided up into three sections: a "Setup" section 360, a "Group Execution" section 362 and a "Printing" section 364. Setup section 360 includes a box 366, labeled "Projects," that enables a moderator to create, delete or select a particular project from among a list of projects, which may be a review of a particular Web site for a particular client. In the alternative, a project may include a focus group study of on-line content representing a product, packaging, text material or the like. Window 368 lists all current, existing projects and a highlighted one of such projects 369 appears in window 370. Button 372 enables the moderator to create a new project, button 374 enables the moderator to delete a highlighted project, button 376 enables a moderator to call up a preexisting project and button 378 enables a moderator to cancel a selected project.

Box 380, labeled "Groups," is organized in a fashion similar to that of Projects box 366, but with respect to specific focus groups. Accordingly, window 382 lists the existing focus groups, window 384 lists a highlighted focus group 386 in window 382, window 388 lists the designated home page to be used by the highlighted focus group 386 in window 382 and displayed in window 384 to which the group pertains and the box 380 also includes an array 390 of buttons providing functions similar to buttons 372–378 of box 366, except that they relate to the creation, deletion, activation or cancellation of groups.

Box 392, labeled "Respondents," enables the moderator to administer the particular focus group displayed in window 384 and highlighted in window 386. Window 394 lists each of the existing respondents in the highlighted group 386, and windows 396, 398, 400 will list the identification number, first and last name, respectively, of a highlighted one of the respondents in window 394. Respondents box 392 also includes an array 402 of buttons that enable the moderator to add or delete respondents, apply a particular respondent group or cancel a respondent group.

Box 404, labeled "Web Pages," enables a moderator to select from a library of existing Web pages, or to create a selection of Web pages, for a particular focus group and project. The Web page selections appear in window 406, and a highlighted one of the Web pages 408 appears in window 410. When a Web page in window 406 is highlighted, it appears in window 410 and is assigned given a business type by selection from pull-down menu 412 and a site type from pull-down menu 414. For example, a business type could be "financial," "educational," "government," "e-commerce" and so on. Similarly, site type could be "business to business," "business to consumer" and so on.

This way each focus group and project are labeled by business and site type so that responses can be grouped in database 30 to build benchmarks for particular types of sites. Such benchmarks can be used to evaluate future Web site ratings.

The box 404 also includes buttons 416 which facilitate the addition and deletion of selected Web pages to the library appearing in box 406 for the highlighted group 386 and project 369.

The Group Execution box 362 includes a "Task Marker" box 418 that lists those tasks associated with the highlighted project 369. Window 420 lists a particular one of the tasks that is to be associated with a current activity of the focus group 386. A menu of available tasks appears in window 422 and a selected task would appear as a highlighted one (not shown) of the tasks in the window 422. A new task can be added and is entered into window 424 of box 418, whereupon it appears in window 422. Button 426 enables the moderator to add the new task appearing in window 424 to the window 422, button 428 enables the moderator to set as the current and active marker for the activity of the group a highlighted one of the tasks appearing in window 420 and button 430 enables the moderator to cancel a selected task. As a result, all of the activity performed by the group will be stored in database 30 (see FIG. 1) associated with the then current and active marker. That way, the activity of the group is categorized by the associated task and can later be reviewed on a task-by-task basis.

The Task Marker box 418 also appears in glimpse view screen 264 (see FIG. 13). The moderator is thus able to vary the task marker for a selected group activity in real time during a focus group session by selecting (i.e., by activating the "Apply" button) a "Current" marker for the data displayed on the screen 264.

"Voting" box 432 enables a moderator to enable or disable the voting activity of the group with respect to the "like," "dislike" etc. icon/buttons.

"Survey" box 434 is directed to the specific survey to be conducted and includes a pulldown menu 436 from which a particular Web page is selected. The "GO" button 438 will initiate a survey with respect to the highlighted Web page appearing in window 436. Box 440 enables the moderator to enable or disable instant messaging between the moderator and the client.

"Client Chat" box 442 enables the moderator to enable or disable the respondents from providing comments, shown in sub-box 444, and includes a sub-box 446 which enables the moderator to allow the respondents to provide comments at their discretion ("Pass") or force comments ("On Command") and, with respect to the latter selection, provides input for the moderator to specify the frequency of the required comments either by frequency of pages at 448 or by time intervals at 450.

"Comments" box 364 pertains to the types of reports printed by the surveys being conducted. "Custom Reports" box 452 is under the Printing column 364 enables the moderator to select from a particular library of custom reports. For example, window 454 displays a sample output file in the Excel® spreadsheet format. Window 456 sets forth the groups from a box 380 from which a moderator may select a particular report. Box 458 enables the moderator to select among a list of Web sites to generate a particular report, pertaining to that Web site.

Figure 23:
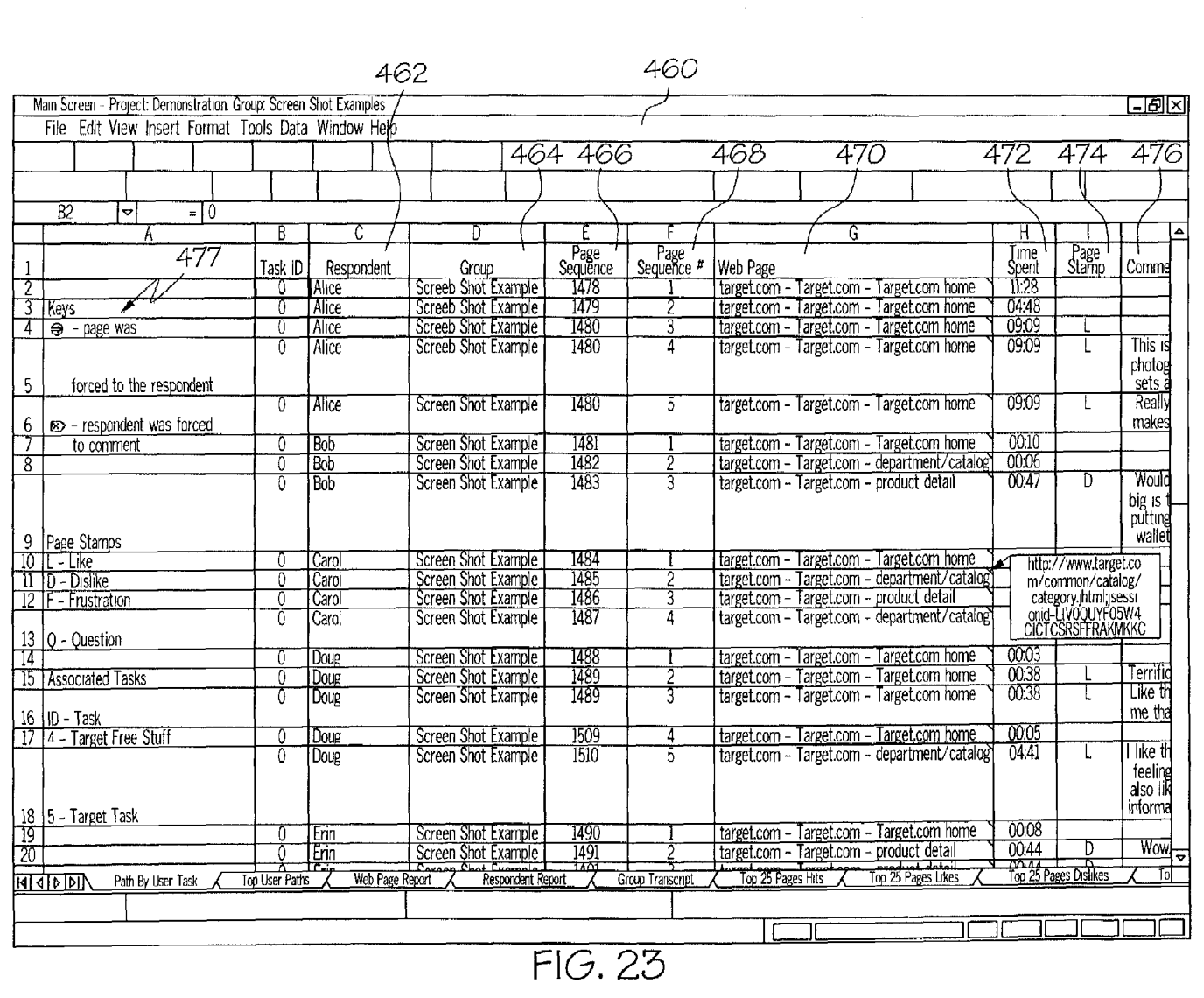

FIG. 23 shows, by way of example, a sample spreadsheet summary 460 of the data gathered in a particular focus study group. Although the manner and types of data displayed on the spreadsheet can be verified according to the Excel® program itself, the particular spreadsheet 460 shown in FIG. 23 displays information pertaining to the various respondents in the column headed "Respondent" 462 of the group displayed. The column 464 headed "Group" displays the name of the group and the page sequence address in the database 30 where the data for that line of the spreadsheet appears appears in the column headed "Page Sequence" 466. The sequence in which the Web pages were viewed by the respondents listed in column 462 is listed in the column headed "Page Sequence#" 468.

The Web page visited is listed in the column headed "Web Page" 470, the time spent at the particular Web page is listed in the column headed "Time Spent" 472, the column listing the button comments for each page and respondent are listed under "Page Stamp" 474 and the text comments provided by the respondents are listed in the "Comments" column 476. Column 477, labeled "Keys," contains information pertaining to whether the corresponding page was forced on the respondent, whether the respondent was forced to provide a comment and also lists other information such as the tasks assigned and explanatory material, such as the definitions of the page stamps 474. Accordingly, the information gathered from the focus group can be presented in a manner which is readily understood by a reader and which can be used to evaluate the impact and "user-friendliness" of a particular Web page or grouping of Web pages.

Additional display/report formats are also possible. For example, a summary format may provide, for each page, the number of hits, number of "Like" votes, number of "Dislike" votes, etc., so that the moderator can identify on a single screen or report the problematic pages. From the summary display screen, the moderator will be permitted to "right-click" on the URL of one of the problematic pages listed, which will cause the URL to be added to the list of pre-defined URLs in the edit/select field 47 of the Web page director bar 46 (see FIG. 2). Later, the moderator will be able to take the entire focus group to the problematic page using the "Go" button 53 on the Web page director bar 46 so that the page can be discussed in detail. Different colors can be used in the display to indicate, for example, Web pages on which users have spent an extraordinary amount of time.

In addition to the ability for respondents to enter comments regarding a particular Web page, the system may also be set up to record visual data (photos or videos) and/or audio data (voice) for each respondent during a visit to a particular Web page. Such data can be stored in the database 30 for later analysis along with the qualitative and quantitative data discussed above.

Figure 24:
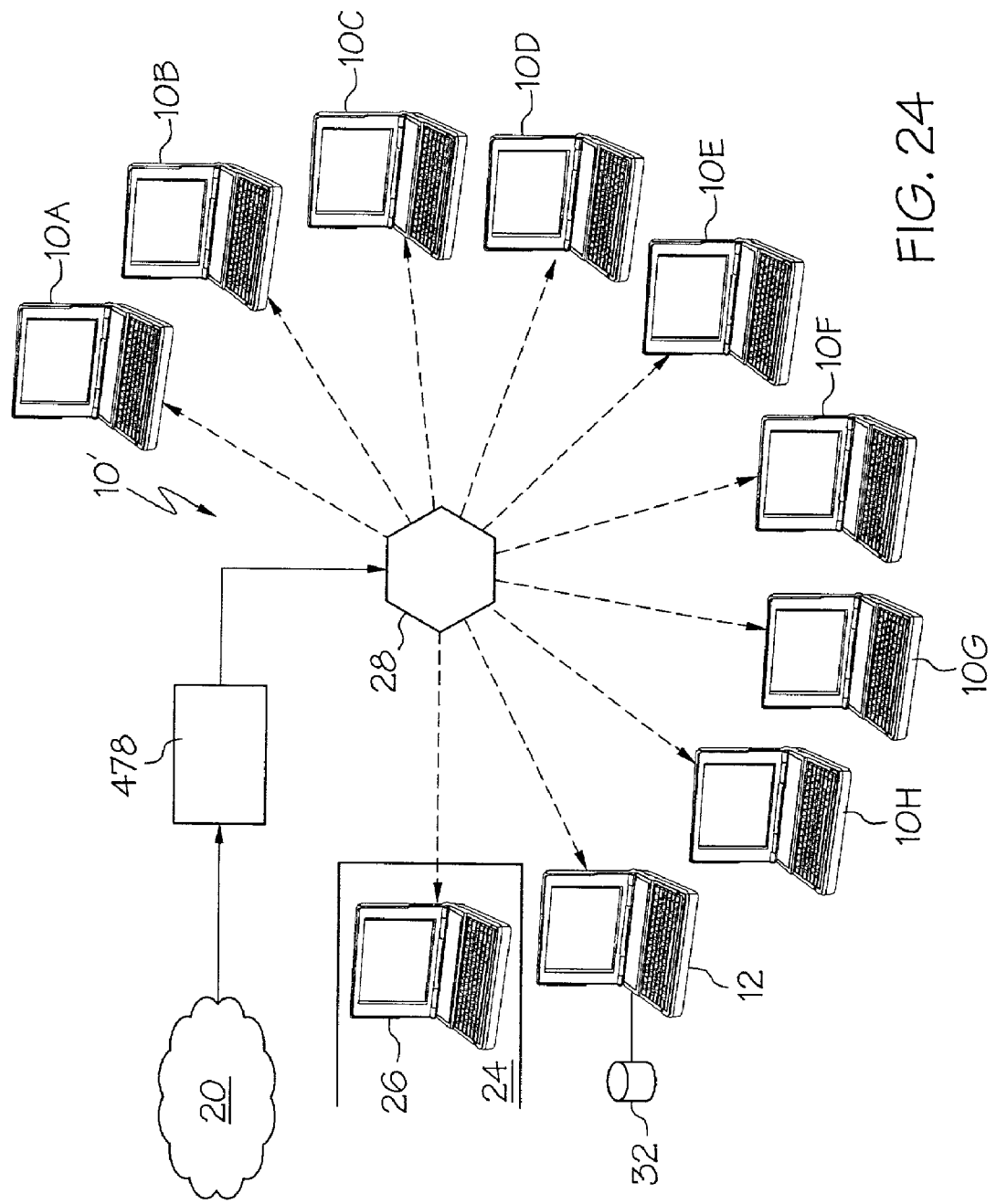
FIG. 24 is a schematic representation of an alternate system embodying the market research method of the present invention.

As shown in FIG. 24, the system 10' of the present invention can be utilized as a "wireless" system. Respondent personal computers 10A–10H are each connected to a wireless hub 28 that is also connected to the moderator computer 12 and to the client computer 26. The client computer 26 and client are preferably isolated in a separate room 24 from the moderator and respondents. The database 32 may be physically incorporated into the moderator computer 12, or in the alternative, may be physically separate from the moderator computer. For example, the database 32 could be stored at remote location and accessed by the moderator computer 12 via the Internet 20 or modem (not shown).

The system 10' shown in FIG. 24 also includes a firewall 478 which not only prevents hacking into the system 10' but assigns IP (internet protocol) addresses to the moderator computer 12, respondent computers 10A–10H and client computer 26. For example, the firewall 478 may utilize software such as Soho (a product of Sonic Wall). In the configuration 10', the moderator computer 12 functions as the proxy server and therefore is loaded with proxy server software, such as Wingate (a product of Deerfield). If the information received by the system 10' to be studied by the respondents is in the form of Web pages, the proxy server software caches the information so that all of the respondents 10A–10H view the same form of a Web page at the same time, which is important when viewing dynamic Web pages.

With the systems 10 of FIG. 1 and 10' of FIG. 24, the market research may be conducted on site. That way, a moderator may conduct a survey using respondents in the same room and collect data into database 30 in the manner described above by soliciting and receiving comments and ratings, then conduct a discussion off-line with the respondents. Such additional information gained offline may be added by the moderator to the database 30.

Figure 25:
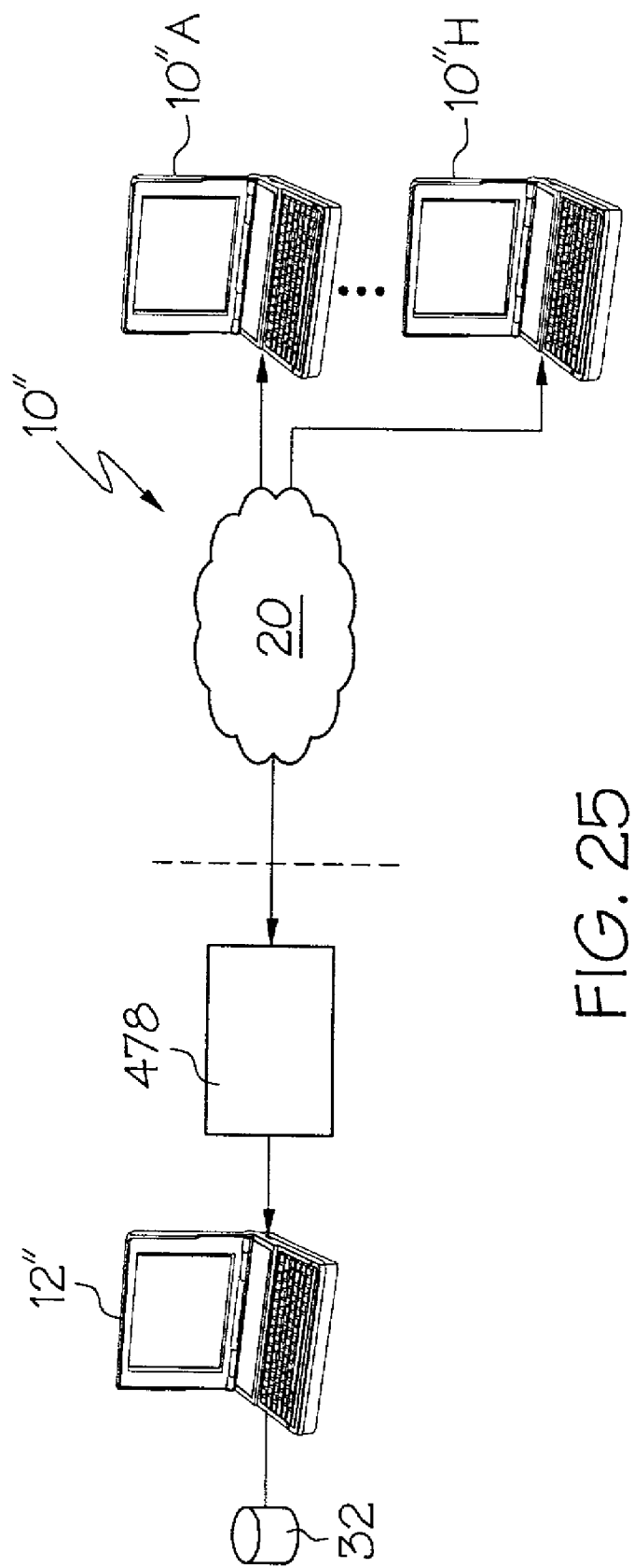
FIG. 25 is a schematic representation of a second alternate system embodying the market research method of the present invention.

As shown in FIG. 25, the system 10" of the present invention may be arranged such that the computers are interconnected via the Internet 20. In that embodiment, the moderator computer 12" is located at a remote, "offsite" location, preferably at the same location as the database 32. In contrast, the respondent computers 10A"–10H" are located at a different locations, which may be the respective homes of the respondents. In this fashion, the Internet 20 would interconnect the respondent computers 10"A–10"H and moderator computer 12". It is within the scope of the invention to provide additional intercommunication between the moderator and respondents with the embodiment of FIG. 25. For example, the computers 10A"–10"H each could be fitted with video cameras and microphones, as well as the moderator computer 12", so that the participants in the market research study could view each other and give and receive verbal instructions. In addition, such an audio/visual interconnection would enable a moderator at the moderator computer 12" to view the facial reactions of the respondents.

With any of the systems 10, 10', 10", it is possible for a moderator to collect data for many such focus studies in database 30 pertaining to a particular category of Web page (or other subject matter, such as a product or packaging), and by compiling such data (e.g., respondent responses in the form of comments, button activations and the like) establish a baseline or benchmark. That benchmark could, if desired, include responses pertaining to competing Websites or other subject matter. Such a benchmark could then be used to evaluate future studies using the method and system of the invention.

Certain embodiments of the system may also provide the respondent browsers with a graphical editor (such as a stripped-down drawing package) to allow the respondents overwrite notes and other indicia onto the screen shots displayed in their specialized browsers. These marked-up screen shots will be stored in the database 30 for later review and analysis.

Over time, use of the present invention to conduct multitudes of focus group studies will enable the user of the present invention to create success benchmarks, which are proprietary databases housing data on consumer perceptions and attitudes embedded in specific but universal questions about Web sites on a by-category, by-consumer target basis. This will allow new clients to have their Web sites benchmarked against previously established norms.

Additionally, the qualitative analysis of the Web site provided by the present invention can be used as a basis for a large-scale quantitative study. This would involve determining from the focus group study a list of questions that would be posed to a much larger group of potential respondents. It is envisioned that the questions would be structured in the form of a questionnaire and/or Web site page checklist that would be transmitted to the large group of respondents. This transmission can be performed using e-mail, for example, that includes the questionnaire, checklist, and a link to the Web site. Alternatively, rather than providing a link, the e-mail may include portions of (or representations of) the Web pages to be analyzed by the recipients as attachments; or the e-mail may be an executable file that includes the questionnaires and Web page representations self-contained therein. Of course, there are alternatives to e-mail transmissions, that include directing the respondents to an FTP site for downloading the questionnaire, checklist and/or Web page representations, for example.

While the preferred embodiment discussed above pertains primarily to Web sites accessible by remote computers over the Internet, it is within the scope of the invention to utilize certain novel aspects of the present invention to perform focus group studies on PDA applications (or any wireless computer/processor, including wireless telephones). For example, it is within the scope of the invention to provide a system for performing focus group studies on at least one software application accessible by remote computers over a network that comprises: (a) a plurality of respondent computers operatively coupled to the network, where each of the respondent computers have a respondent software device programmed to download and run the software application from the network and including a respondent graphical user interface program to operate simultaneously with the software application on the respondent computer, where the respondent graphical user interface includes at least a favorable ratings button and an unfavorable ratings button and (b) at least one moderator computer operatively coupled to each of the respondent computers having a moderator software device and a database, where the moderator software device is programmed to communicate with each of the respondent software devices operating on the respondent computers, collect rating signals from the respondent computers corresponding to the activation of rating buttons on the respondent graphical user interfaces and store data associated with the rating signals collected in the database.

What is claimed is:

1. A system for performing focus group studies, comprising:
   a plurality of respondent computers operatively coupled to the network, each of the respondent computers having a respondent software device programmed to download and display web pages from a Web site that is the subject of a focus group study as a respondent user of the respondent computer navigates within the Web site, the respondent browser device having a graphichal user interface having at least two rating buttons displayed on the respondent graphical user interface simultaneously with Web page from the Web site, the rating buttons including a favorable rating button and a disfavorable rating button configured for use in expressing a respondent user's reaction to a simultaneously displayed Web page from the Web site that is the subject of the focus group study; and
   at least one moderator computer operatively coupled to each of said respondent computers having a moderator software device and a database, said moderator software device being programmed to communicate with each of the respondent browser devices operating on the respondent computers, collect rating signals from the respondent computers corresponding to activation of rating buttons on the graphical user interfaces of the respondent browser devices, collect a navigation history for each respondent computer during the focus group study, the navigation history including address data corresponding to Web pages being displayed during activation of the rating buttons, and store the navigation history and data associated with the rating signals collected in the database such that each collected rating signal is associated with a Web page from the Web site, wherein the stored navigation history and data associated with the rating signals are for evaluating the design of the Web pages from the Web site that is the subject of the focus group study.

2. The system of claim 1, wherein at least one respondent computer is a hand-held computer.

3. The system of claim 2, wherein the hand-held computer includes a wire-less modem for operatively coupling to the moderator computer.

4. The system of claim 1, further comprising a digital sound recorder operatively coupled to at least one of the respondent computers, wherein the respondent computer is further programmed to create a digital recording of sounds made by a user during the focus group session, and wherein the moderator software device is further programmed to collect the digital recording from the respondent computer and store the digital recording in the database along with data associated with rating signals collected in the database.

5. The system of claim 1, further comprising a digital video recorder operatively coupled to at least one of the respondent computers, wherein the respondent computer is further programmed to create a digital recording of facial gestures made by a user during the focus group session, and wherein the moderator software device is further programmed to collect the digital recording from the respondent computer and store the digital in the database along with data associated with rating signals collected in the database.

6. The system of claim 1, further comprising at least one client computer operatively coupled to the moderator computer and including a client software device for displaying real-time data collected by the moderator software device from the respondent computers.

7. The system of claim 1, wherein:
   the graphical user interface of the respondent browser device is further programmed to query a user of the respondent computer for a comment responsive to a user activating a particular rating button; and
   the moderator software device is further programmed to collect the comment from the respondent browser device and store the comment in the database along with data associated with the rating signal collected from the respondent computer that corresponds to the particular rating button.

8. The system of claim 7, wherein:
   the moderator computer includes a moderator graphical user interface programmed to display data associated with the rating signals and comments collected in real-time.

9. The system of claim 8, wherein the moderator graphical user interface is programmed to display real-time rating signal data and corresponding comments for several of the plurality of respondent computers in real-time.

10. The system of claim 9, wherein the moderator software device includes a clock, and is further programmed to record timing data corresponding to the rating signal data and comments stored in the database.

11. The system of claim 10, wherein the moderator graphical user interface is programmed to display real-time rating signal data, comments, timing data and address data for several of the plurality of respondent computers in real-time.

12. The system of claim 11, wherein the moderator software device is further programmed to specify the Web page address for each of the respondent computers.

13. The system of claim 11, wherein:
the respondent browser device is further programmed to generate a snap shot of the Web page substantially as it appears on a display device of the respondent computer; and
the moderator software device is further programmed to collect the snap shot from the respondent browser device and store the snap shot in the database along with data associated with rating signals collected in the database.

14. The system of claim 13, wherein moderator graphical user interface is further programmed to display a snap shot collected from the respondent browser device along with real-time rating signal data, comments, timing data and address data for at least one of the plurality of respondent computers.

15. The system of claim 13, wherein the respondent browser device is further programmed to allow a user to overwrite marks and notations onto the snap shot.

16. The system of claim 1, wherein the graphical user interface of the respondent browser device further includes a frustration (or analogous) ratings button.

17. The system of claim 1, wherein the graphical user interface of the respondent browser device further includes a question ratings button.

18. The system of claim 1, wherein the moderator software device is programmed to selectively prevent a respondent computer from navigating from a first Web page to a second Web page without first receiving user feedback on the first Web page.

19. The system of claim 1, wherein the moderator software device is further programmed to track an interval of time each of Web page is displayed by each respondent computer.

20. The system of claim 1, wherein the moderator software device is further programmed to track a sequence of Web pages navigated to by each respondent computer during the focus group session.

21. The system of claim 1, wherein the moderator software device is programmed to collect user feedback from a respondent user and associate the user feedback with a currently displayed Web page.

22. The system of claim 21, wherein the moderator software device is programmed to associate the collected user feedback with a task, and to indicate an association with the task in a display of the collected user feedback.

23. The system of claim 21, wherein the moderator software device is programmed to assign a task to at least one respondent, and to indicate in the database an association between the assigned task and a navigation history collected subsequent to assigning the task.

24. The system of claim 21, wherein the moderator software device is programmed to indicate in the database an association between the collected user feedback and a preselected project name associated with the focus group study.

25. The system of claim 24, wherein the moderator software device is programmed to assign at least one group to the preselected project name, and to assign at least one respondent to the at least one group.

26. The system of claim 21, wherein the moderator software device is programmed to output a report displaying the collected user feedback for use in analyzing results of the focus group study.

27. The system of claim 26, wherein the report displays the collected user feedback filtered for at least one of a project, a group, a respondent and a Web page.

28. The system of claim 21, wherein the moderator software device is programmed to solicit additional user feedback from a respondent based upon the collected user feedback.

29. The system of claim 21, wherein the moderator software device is programmed to display collected user feedback to a moderator in real time.

30. The system of claim 1, wherein the moderator software device is programmed to collect a location in a currently displayed Web page with which collected user feedback is associated and to indicate in the database an association between the collected user feedback and the location in the currently displayed Web page.

31. The system of claim 1, wherein the moderator software device is programmed to transmit a survey to the recipient computers and collect survey results therefrom.

32. The system of claim 1, wherein the moderator software device is programmed to exchange instant messages between a moderator and a client for the focus group study.

33. The system of claim 1, wherein the moderator software device is programmed to receive user feedback from a respondent in a manner that is private from other respondents.

34. The system of claim 1, wherein the plurality of respondent computers and the at least one moderator computer are physically located in the same room during the focus group session to permit non-electronic conversation between a moderator and at least one respondent.

35. A method for performing a focus group study, comprising the steps of:
in each of a plurality of respondent computers, navigating among a plurality of Web pages in a Web site that is a subject of a focus group study in response to user input received from a respondent in a focus group during a focus group session, including displaying each Web page navigated to by the respondent in a respondent browser device on the respondent computer, and receiving feedback from the respondent via a graphical user interface on the respondent device, wherein the graphical user interface includes at least one rating button through which the respondent expresses that respondent's reaction to a currently displayed Web page from the Web site that is the subject of the focus aroup study in the respondent browser device;
in at least one moderator computer operatively coupled to each of the respondent computers, communicating with the plurality of respondent computers to track the navigation of each respondent through the Web site when each respondent is interacting with the Web site to perform an assigned task, including tracking a current Web page displayed in each respondent browser device, logging and storing in a database a navigation history for each respondent browser device over the course of the focus group session, and detecting activation of the rating button in each respondent computer, and
in response to detecting activation of the rating button in a respondent computer, storing user feedback associated with the respondent using the respondent computer in the database, including associating the stored user feedback in the database with the current Web page displayed on the respondent computer when the rating button is activated, wherein the stored navigation history and stored user feedback are for evaluating the design of the Web pages from the Web site that is the subject of the focus group study.

36. The method of claim 35, further comprising the steps of:
responsive to the activation of a rating button on the first one of the respondent computers, recording comment data by the first one of the respondent computers;
collecting the comment data from the first one of the respondent computers in the at least one moderator computer; and
storing the comment data collected by the at least one moderator computer into the database such that the comment data is associated with the first one of the respondent computers.

37. The method of claim 36, wherein the step of recording comment data includes a step of providing an area on the graphical user interface of the respondent browser device of the first one of the respondent computers for recording comments typed in by a user of the first one of the respondent computers.

38. The method of claim 36, wherein the step of recording comment data includes a step of recording a voice of a user of the first one of the respondent computers.

39. The method of claim 36, wherein the step of recording comment data includes a step of recording a video of a user of the first one of the respondent computers.

40. The method of claim 36, wherein the step of recording comment data includes a step of providing a snap shot of the Web page and recording notations made by a user of the first one of the respondent computers on the snap shot using a marking device associated with the graphical user interface of the respondent browser device of the first one of the respondent computers.

41. The method of claim 36, further comprising the steps of:
using at least one of the rating signals and comment data to identify specific issues regarding the Web page;
generating a questionnaire related to the specific issues;
distributing the questionnaire to a large group of remote respondents; and
receiving responses to the questionnaire from at least a portion of the large group of respondents.

42. The method of claim 41, wherein the step of distributing the questionnaire to the large group of remote respondents includes the step of sending an electronic mail message to each of the large group of respondents, wherein the electronic mail message includes the questionnaire and a representation of the Web page.

43. The method of claim 42, wherein the representation of the Web page is a link to the Web page.

44. The method of claim 42, wherein the questionnaire and Web page representation are embodied in an executable program sent with the electronic mail message.

45. The method of claim 42, wherein the step of distributing the questionnaire to the large group of remote respondents includes the step of directing the large group of respondents to a location on the Internet from which the large group of respondents can download the questionnaire and representation of the Web page.

46. The method of claim 45, wherein the representation of the Web page is a link to the Web page.

47. The method of claim 45, wherein the questionnaire and Web page representation are embodied in an executable program downloaded from the location on the Internet.

48. The method of claim 35, further comprising displaying user feedback stored in the database in real time on the moderator computer.

49. The method of claim 35, wherein tracking the navigation of each respondent through the Web site includes tracking a time a Web page is navigated to on a respondent computer.

50. The method of claim 35, wherein tracking the navigation of each respondent through the Web site includes tracking a length of time a Web page is displayed on a respondent computer.

51. The method of claim 35, wherein tracking the navigation of each respondent through the Web site includes tracking a sequence of Web pages navigated to by each respondent computer during the focus group session.

52. The method of claim 35, wherein the at least one rating button includes a favorable and an unfavorable rating button.

53. The method of claim 52, wherein the at least one rating button further includes at least one of a frustration and a question rating button.

54. The method of claim 35, further comprising preventing, with the moderator computer, a respondent computer from navigating from a first Web page to a second Web page without first receiving user feedback on the first Web page.

55. The method of claim 35, further comprising in the at least one moderator computer associating collected user feedback with a task, and indicating an association with the task in a display of the collected user feedback.

56. The method of claim 35, further comprising in the at least one moderator computer assigning a task to at least one respondent, and indicating in the database an association between the assigned task and a navigation history collected subsequent to assigning the task.

57. The method of claim 35, further comprising in the at least one moderator computer indicating in the database an association between collected user feedback and a preselected project name associated with the focus group study.

58. The method of claim 57, further comprising in the at least one moderator computer assigning at least one group to the preselected project name, and assigning at least one respondent to the at least one group.

59. The method of claim 35, further comprising in the at least one moderator computer outputting a report displaying collected user feedback for use in analyzing results of the focus group study.

60. The method of claim 59, wherein the report displays collected user feedback filtered for at least one of a project, a group, a respondent and a Web page.

61. The method of claim 35, further comprising in the at least one moderator computer exchanging instant messages between a moderator and a client for the focus group study.

62. The method of claim 35, further comprising in the at least one moderator computer receiving user feedback from a respondent in a manner that is private from other respondents.

63. The method of claim 35, wherein the plurality of respondent computers and the at least one moderator computer are physically located in the same room during the focus group session to permit non-electronic conversation between a moderator and at least one respondent.

64. An apparatus, comprising:
at least one moderator computer configured to be coupled to a plurality of respondent computers for use in performing a focus group study, and
moderator software resident on the at least one moderator computer and programmed to perform a focus group study by:
communicating with the plurality of respondent computers while a plurality of respondents in a focus group use the plurality of respondent computers to navigate among a plurality of Web pages in a Web site that is a subject of a focus group study during a focus group session;

logging and storing in a database a navigation history for each respondent over the course of the focus group session, including tracking a current Web page displayed by a browser on each respondent computer;

collecting user feedback from each respondent over the course of the focus group session, including receiving user feedback associated with activation of a rating button displayed in a graphical user interface of a respondent computer while a current Web page is displayed in the browser on the respondent computer; and storing the collected user feedback in the database, including associating the user feedback associated with the activation of the rating button with the current Web page displayed on the respondent computer when the rating button is activated, wherein the stored navigation history and stored user feedback are for evaluating the design of the Web pages from the Web site that is the subject of the focus group study.

65. A method for performing a focus group study, comprising, in at least one moderator computer coupled to a plurality of respondent computers:

communicating with the plurality of respondent computers while a plurality of respondents in a focus group use the plurality of respondent computers to navigate among a plurality of Web pages in a Web site that is a subject of a focus group study during a focus group session;

logging and storing in a database a navigation history for each respondent over the course of the focus group session, including tracking a current Web page displayed by a browser on each respondent computer;

collecting user feedback from each respondent over the course of the focus group session, including receiving user feedback associated with activation of a rating button displayed in a graphical user interface of a respondent computer while a current Web page is displayed in the browser on the respondent computer; and storing the collected user feedback in the database, including associating the user feedback associated with the activation of the rating button with the current Web page displayed on the respondent computer when the rating button is activated, wherein the stored navigation history and stored user feedback are for evaluating the design of the Web pages from the Web site that is the subject of the focus group study.

66. An article of manufacture, comprising:

a computer readable medium; and moderator software resident on the computer readable medium and configured to be executed by a moderator computer coupled to a plurality of respondent computers, the moderator software programmed to perform a focus group study by;

communicating with the plurality of respondent computers while a plurality of respondents in a focus group use the plurality of respondent computers to navigate among a plurality of Web pages in a Web site that is a subject of a focus group study during a focus group session;

logging and storing in a database a navigation history for each respondent over the course of the focus group session, including tracking a current Web page displayed by a browser on each respondent computer;

collecting user feedback from each respondent over the course of the focus group session, including receiving user feedback associated with activation of a rating button displayed in a graphical user interface of a respondent computer while a current Web page is displayed in the browser on the respondent computer; and storing the collected user feedback in the database, including associating the user feedback associated with the activation of the rating button with the current Web page displayed on the respondent computer when the rating button is activated, wherein the stored navigation history and stored user feedback are for evaluating the design of the Web pages from the Web site that is the subject of the focus group study.

* * * * *

UNITED STATES PATENT AND TRADEMARK OFFICE
CERTIFICATE OF CORRECTION

PATENT NO. : 7,181,696 B2
APPLICATION NO. : 09/945933
DATED : February 20, 2007
INVENTOR(S) : Stephen P. Brock It is certified that error appears in the above-identified patent and that said Letters Patent is hereby corrected as shown below:

In Column 6 line 35, "…of Redmond Wash.)…" should read --… of Redmond, Wash.)…--.

In column 11 lines 63-64, "…and in image window 142." should read --… and an image window 142.--.

In column 12 line 64, "… responds to of the icons 128 in the …" should read --…responds to the icons 128 in the …--.

In column 13 lines 25-26, "… respondent provided a comment) the comment or "stamp" …" should read --… respondent provided a comment), the comment or "stamp"…--.

In column 13 lines 29-30, "… provided by the recipients, …" should read --… provided by the respondents,…--.

In column 13 line 31, "… the time elapsed time since the last …" should read --…the time elapsed since the last…--.

In column 13 lines 55-56, "… enabler disable the ability…" should read --…enable or disable the ability…--.

In column 16 lines 51-52, "… is under the …enables the moderator to …" should read --…under the … enables the moderator to …--.

In column 18 line 25, "… 10A"-10"H …" should read --…10"A-10"H …--.

In Column 18 lines 45-46, "… allow the respondents overwrite notes and …" should read --… allow the respondents to overwrite notes and …--.

In column 19 lines 20-21, "… each of … have a respondent software device …" should read --… each of … has a respondent software device …--.

In column 19 line 41 CLAIM 1, "…to the network, each of the …" should read --…to the Internet, each of the …--.

In column 19 line 42 CLAIM 1, "…having a respondent software device programmed…" should read --…have a respondent browser device programmed…--.

UNITED STATES PATENT AND TRADEMARK OFFICE
CERTIFICATE OF CORRECTION

PATENT NO. : 7,181,696 B2
APPLICATION NO. : 09/945933
DATED : February 20, 2007
INVENTOR(S) : Stephen P. Brock It is certified that error appears in the above-identified patent and that said Letters Patent is hereby corrected as shown below:

In column 19 line 49 CLAIM 1, "...with Web page from the Web site, ..." should read --... with Web pages from the Web site, ...--.

In column 20 line 29 CLAIM 5, "... and store the digital in the database along with ..." should read --... and store the digital recording in the database along with ...--.

In column 21 line 33 CLAIM 19, "... time each of Web page is displayed by ..." should read --... time each Web page is displayed by ...--.

In column 22 line 56 CLAIM 22, "...in each respondent computer, and ..." should read --...in each respondent computer; and ...--.

In column 26 line 15 CLAIM 66, " ... perform a focus group study by; ..." should read --... perform a focus group study by: ..."

Signed and Sealed this

Fourth Day of December, 2007

JON W. DUDAS
*Director of the United States Patent and Trademark Office*